US009413006B2

(12) United States Patent
Kay

(10) Patent No.: US 9,413,006 B2
(45) Date of Patent: Aug. 9, 2016

(54) LITHIUM MANGANESE PHOSPHATE/CARBON NANOCOMPOSITES AS CATHODE ACTIVE MATERIALS FOR SECONDARY LITHIUM BATTERIES

(71) Applicant: Dow Global Technologies LLC, Midland, MI (US)

(72) Inventor: Andreas Kay, Lausanne (CH)

(73) Assignee: Dow Global Technologies LLC

( * ) Notice: Subject to any disclaimer, the term of this patent is extended or adjusted under 35 U.S.C. 154(b) by 108 days.

(21) Appl. No.: 14/301,374

(22) Filed: Jun. 11, 2014

(65) Prior Publication Data

US 2014/0295275 A1    Oct. 2, 2014

Related U.S. Application Data

(62) Division of application No. 12/922,639, filed as application No. PCT/IB2009/051560 on Apr. 14, 2009, now Pat. No. 8,784,694.

(30) Foreign Application Priority Data

Apr. 14, 2008  (WO) ................. PCT/IB2008/051418

(51) Int. Cl.
| | | |
|---|---|---|
| H01M 4/62 | (2006.01) | |
| H01M 4/58 | (2010.01) | |
| H01M 4/36 | (2006.01) | |
| C01B 25/45 | (2006.01) | |

(52) U.S. Cl.
CPC ............ H01M 4/5825 (2013.01); C01B 25/45 (2013.01); H01M 4/364 (2013.01); H01M 4/625 (2013.01)

(58) Field of Classification Search
CPC ............................ H01M 4/5825; H01M 4/625
USPC .......... 252/506, 507, 508, 509; 429/220, 224, 429/221, 223, 231.8
See application file for complete search history.

(56) References Cited

U.S. PATENT DOCUMENTS

| | | | |
|---|---|---|---|
| 5,910,382 A | 6/1999 | Goodenough et al. | |
| 6,514,640 B1 | 2/2003 | Armand et al. | |
| 6,632,566 B1 | 10/2003 | Yamada et al. | |
| 6,749,967 B2 | 6/2004 | Li et al. | |
| 7,029,795 B2 | 4/2006 | Li | |
| 7,122,272 B2 | 10/2006 | Okawa et al. | |
| 7,147,969 B2 | 12/2006 | Yamada et al. | |
| 7,217,474 B2 | 5/2007 | Yamada et al. | |
| 7,745,047 B2 | 6/2010 | Zhamu et al. | |
| 8,119,288 B2 | 2/2012 | Zhamu et al. | |
| 8,435,677 B2 | 5/2013 | Kay | |
| 8,540,902 B2 | 9/2013 | Xing et al. | |
| 8,580,432 B2 | 11/2013 | Zhamu et al. | |
| 8,586,238 B2 | 11/2013 | Chiang et al. | |
| 8,586,245 B2 | 11/2013 | Yamaguchi et al. | |
| 8,613,873 B2 | 12/2013 | Yamaguchi et al. | |
| 8,663,850 B2 | 3/2014 | Inagaki et al. | |
| 8,865,349 B2 * | 10/2014 | Okada ..................... C01B 25/45 | 429/224 |
| 2001/0055718 A1 | 12/2001 | Li et al. | |
| 2002/0106563 A1 | 8/2002 | Okawa et al. | |
| 2004/0202934 A1 | 10/2004 | Zaghib et al. | |
| 2007/0009801 A1 | 1/2007 | Inagaki et al. | |
| 2008/0285211 A1 | 11/2008 | Zaghib et al. | |
| 2009/0011333 A1 | 1/2009 | Wakita et al. | |
| 2009/0081558 A1 | 3/2009 | Inagaki et al. | |
| 2009/0117466 A1 | 5/2009 | Zhamu et al. | |
| 2009/0117467 A1 | 5/2009 | Zhamu et al. | |
| 2009/0186275 A1 * | 7/2009 | Exnar ...................... C01B 25/45 | 429/220 |
| 2010/0028777 A1 | 2/2010 | Ueda et al. | |
| 2010/0143798 A1 | 6/2010 | Zhamu et al. | |
| 2010/0176337 A1 | 7/2010 | Zhamu et al. | |
| 2010/0178562 A1 | 7/2010 | Exnar et al. | |
| 2012/0009452 A1 | 1/2012 | Ueda | |
| 2013/0040187 A1 | 2/2013 | Inagaki et al. | |
| 2014/0363635 A1 * | 12/2014 | Upreti ................... H01M 4/624 | 428/195.1 |
| 2015/0099179 A1 * | 4/2015 | Ikenuma ............. H01M 4/0402 | 429/224 |

FOREIGN PATENT DOCUMENTS

| | | |
|---|---|---|
| CN | 101081696 A | 12/2007 |
| EP | 1094532 A1 | 4/2001 |
| EP | 1193786 B1 | 4/2007 |

(Continued)

OTHER PUBLICATIONS

Nakamizo, M., et al., "Raman spectra of ground natural graphite," Carbon, 1978, 16, (4), 281-283.
Yue, M., et al., "Ferric phosphate lithium material for lithium ion powder cell and preparation method thereof," Dec. 5, 2007; Machine Translation of CN101081696A, Shenzhen BTR Energy materials.
Wang, L., et al., "Nano-LiFePO4/MWCNT Cathode Materials Prepared by Room-Temperature Solid-State Reaction and Microwave Heating," Journal of the Electrochemical Society, 154, (11), A1015-A1019, 2007, Institute of Applied Chemistry, Xinjiang University, Urumqi 830046, Xinjiang, People's Republic of China.

(Continued)

*Primary Examiner* — Douglas McGinty

(57) ABSTRACT

The invention relates to a lithium manganese phosphate/carbon nanocomposite as cathode material for rechargeable electrochemical cells with the general formula $Li_xMn_yM_{1-y}(PO_4)_z/C$ where M is at least one other metal such as Fe, Ni, Co, Cr, V, Mg, Ca, Al, B, Zn, Cu, Nb, Ti, Zr, La, Ce, Y, x=0.8-1.1, y=0.5-1.0, 0.9<z<1.1, with a carbon content of 0.5 to 20% by weight, characterized by the fact that it is obtained by milling of suitable precursors of $Li_xMn_yM_{1-y}(PO_4)_z$ with electro-conductive carbon black having a specific surface area of at least 80 m²/g or with graphite having a specific surface area of at least 9.5 m²/g or with activated carbon having a specific surface area of at least 200 m²/g. The invention also concerns a process for manufacturing said nanocomposite.

7 Claims, 26 Drawing Sheets

(56) References Cited

FOREIGN PATENT DOCUMENTS

| | | |
|---|---|---|
| EP | 2015382 A1 | 4/2009 |
| EP | 1193783 B1 | 2/2011 |
| EP | 1193784 B1 | 1/2012 |
| EP | 1184920 B1 | 5/2012 |
| EP | 1193787 B1 | 5/2012 |
| JP | 2003-257429 A | 9/2003 |
| JP | 2005050684 A | 2/2005 |
| JP | 2005123107 A | 5/2005 |
| WO | 2007113624 A1 | 10/2007 |
| WO | 2009127901 A1 | 10/2009 |
| WO | 2009144600 A2 | 12/2009 |
| WO | 2010005969 A2 | 1/2010 |

OTHER PUBLICATIONS

Yasuhiro, N., et al., "Manufacturing Method of Carbon Complex of Lithium-Iron-Phosphor Group Complex Oxide Containing Mn Atom," Machine Translation of JP2005-050684, Feb. 24, 2005, Nippon Chem Ind Co Ltd.

Masaru, M., et al. "Active Material for Electrochemical Element, its Manufacturing Method, and the Electrochemical Element Using the Same", Machine Translation of JP2005123107, May 12, 2005, Hitachi Maxell Ltd.

Chen, J., et al., "Hydrothermal synthesis of lithium iron phosphate", Electrochemistry Communications 8, 2006, 855-858, Department of Chemistry and Institute for Materials Research, State University of New York at Binghamton, Binghamton, NY 13902-6000, USA.

Howard, W.F., et al., "Theoretical evaluation of high-energy lithium metal phosphate cathode materials in Li-ion batteries," Journal of Power Sources, 2007, 165, (2), 887-891.

Padhi, A.K., et al., "Phospho-olivines as positive-electrode materials for rechargeable lithium batteries," Journal of the Electrochemical Society, 1997, 144, (4), 1188-1194.

Li, G.H., et al., "LiMnPO4 as the cathode for lithium batteries," Electrochemical and Solid State Letters, 2002, 5, (6), A135-A137.

Yamada, A., et al., "Crystal chemistry of the olivine-type Li(MnyFe1-y)PO4 and (MnyFe1-y)PO4 as possible 4V cathode materials for lithium batteries," Journal of the Electrochemical Society, 2001, 148 (8), A960-A967.

Yamada, A., et al., "Olivine-type cathodes achievements and problems." Journal of Power Sources, 2003, 119-121, 232-238.

Li, G.H., et al., "Optimized LiMnyFe1-yPO4 as the cathode for lithium batteries," Journal of the Electrochemical Society, 2002, 149, (6), A743-A747.

Delacourt, C., et al., "Toward understanding of electrical limitations (electronic, ionic) in LiMPO4 (M=Fe, Mn) electrode materials", Journal of the Electrochemical Society, 2005, 152, A913-A921.

Molenda, J., et al, "Electrical conductivity and reaction with lithium of LiFe1-yMnyPO4 olivine-type cathode materials," Journal of Power Sources, 2007, 174, (2), 689-694.

Delacourt, C., et al., One-step low-temperature route for the preparation of electrochemically active LiMnPo4 powders, Chemistry of Materials, 2004, 16 (1), 93-99.

Delacourt, C., et al., Low temperature preparation of optimized phosphates for Li-battery applications, Solid State Ionics, 2004, 173, (1-4), 113-118.

Fang, H.S., et al., "Hydrothermal synthesis of electrochemically active LiMnPO4," Chemistry Letters, 2007, 36, (3) 436-437.

Mi, C.H., et al., "Synthesis and performance of LiMn0.6Fe0.4PO4/ nano-carbon webs composite cathode," Materials Science and Engineering B-Solid State Materials for Advanced Technology 2006, 129, (1-3), 8-13.

Drezen, T., et al., "Effect of particle size on LiMnPO4 cathodes," Journal of Power Sources, 2007, 174, (2), 949-953.

Kwon, N.H., et al., "Enhanced electrochemical performance of mesoparticulate LiMnPO4 for lithium ion batteries", Electrochemical and Solid State Letters, 2006, 9, (6), A277-A280.

Kwon Roth, N.H., "Mesoscopic manganese based cathode materials for high voltage lithium ion batteries," Ph.D. Thesis, Ecole Polytechnique Federale De Lausanne, 2006, No. 3502, 1-8, Abstract in English and French.

Yamada, A., et al., "Reaction mechanism of the olivine-type Li-x(Mn0.6Fe0.4)PO4 (0<=x<=1)," Journal of the Electrochemical Society, 2001, 148, (7), A747-A754.

Tuinstra, F., et al., "Raman Spectrum of Graphite," Journal of Chemical Physics, Aug. 1, 1970, 53, (3), 1126-1130.

Yamada, A., et al., "Phase diagram of Li-x(MnyFe1-y)PO4 (0<=x, y<=1)," Journal of the Electrochemical Society, 2001, 148, (10), A1153-A1158.

Yamada, A., et al., "Fast Charging LiFePO4," Electrochemical and Solid-State Letters, 2005, (1), A55-A58.

Yamada, A., et al., "Electrochemical, magnetic, and structural investigation of the Li-x(MnyFe1-y)PO4 olivine phases", Chemistry of Materials, 2006, 18, (3), 804-813.

Meethong, N., et al., "Strain accommodation during phase transformations in olivine-based cathodes as a materials selection criterion for high-power rechargeable batteries," Advanced Functional Materials, 2007, 17, 1115-1123.

Kopec, M., et al., "Structural and magnetic properties of Lix(MnyFe1-y)PO4 electrode materials for Li-ion batteries", Journal of Power Sources, 2009, 1154-1163.

Wang, L., et al., "Ablnitio Study of the Surface Properties and Nanoscale Effects of LiMnPO4," Electrochemical and Solid-State Letters, 2008, 11, (6), A94-A96.

Boldyrev, V.V., Mechanochemistry and mechanical activation of solids, Russian Chemical Reviews, 2006, 75, (3), 177-189.

Suryanaraya, C., Mechanical Alloying and Milling, Progress in Materials Science, 46, 2001, Marcel Dekker: New York, 2004, 1-184.

Tarascon, J.M., et al., "On the benefits of ball milling within the field of rechargeable Li-based batteries," CR Chimie, 2005, 8, (1), 17-26.

Wissler, M., "Graphite and carbon powders for electrochemical applications," Journal of Power Sources, 2006, 156, (2), 142-150.

Ozawa, M., et al., "Carbon Blacks as the Source materials for Carbon, in Carbon Nanotechnology", Dai, L. (Ed.), Chapt. 6, 127-151, Elsevier:Dordrecht 2006.

Tashima, D., et al., "Space charge behaviors of electric double layer capacitors with nanocomposite electrode," Surface & Coatings Technology, 2007, 201, (9-11), 5392-5395.

Gaberscek, M., et al., "Is small particle size more important than carbon coating? An example study on LiFePO4 cathodes," Electrochemistry Communications, 2007, 9, (12), 2778-2783.

Nelson, J.R., et al., "Morphology of Electrically Conductive Grades of Carbon-Black," Carbon, 1986, 24, (2), 115-121.

Antisari, M.V., et al, Low energy pure shear milling: A method for the preparation of graphite nano-sheets, Scripta Materialia, 2006, 55, (11), 1047-1050.

Wong, S.C., et al., "Materials processes of graphite nanostructured composites using ball milling," Materials and Manufacturing Processes, 2006, 21, (20), 159-166.

Drofenik, M., et al., "Synthesis of carbon nanostructures with mechanical alloying," Progress in Advanced Materials and Processes, 2004, 453-454, 213-218.

Chen, X.H., et al., "Generation of curved or closed-shell carbon nanostructures by ball-milling of graphite," Journal of Crystal Growth, 2000, 218, (1), 57-61.

Chen, Y., et al., "Nanoporous carbon produced by ball milling," Applied Physics Letters, 1999, 74, (1)9, 2782-2784.

Huang, J.Y., et al., "Highly curved carbon nanostructures produced by ball-milling," Chemical Physics Letters, 1999, 303, (1-2), 130-134.

Harker, H., et al., "Active Centres Produced in Graphite by Powdering," Carbon, 1971, 9, (1), 1-9.

Hentsche, M., et al., "Nanostructured graphite prepared by ball-milling at low temperatures," Carbon, 2006, 44, (4), 812-814.

Salver-Disma, F., et al., "Transmission electron microscopy studies on carbon materials prepared by mechanical milling," Carbon, 1999, 37, (12), 1941-1959.

Janot, R., et al., "Ball-milling: the behavior of graphite as a function of the dispersal media," Carbon, 2002, 40, (15), 2887-2896.

Ong, T.S., et al., "Effect of atmosphere on the mechanical milling of natural graphite," Carbon, 2000, 38, (15), 2077-2085.

(56) References Cited

OTHER PUBLICATIONS

Salver-Disma, F., et al., "Physical characterization of carbonaceous materials prepared by mechanical grinding," Journal of Power Sources, 1999, (81-82), 291-295.

Geim, A.K., et al., "The rise of graphene", Nature Materials, 2007, 6 (3), 183-191.

Jiang, D.E., et al., "Unique chemical reactivity of a graphene nanoribbon's zigzag edge," Journal of Chemical Physics, 2007, 126, 134701-1 through 134701-6.

Enoki, T., et al., "Electronic structures of graphene edges and nanographene," International Reviews in Physical Chemistry, Oct.-Dec. 2007, 26, (4), 609-645.

Hermann, H., et al., "Structure and chemical reactivity of ball-milled graphite," Nanostructured Materials, 1997, 8, (2), 215-229.

Francke, M., et al., "Modification of carbon nanostructures by high energy ball-milling under argon and hydrogen atmosphere," Carbon 2005, 43, (6), 1204-1212.

Li, G., et al., "X-ray absorption study of $Li_xMn_yFe_{1-y}PO_4$ ($0<=x<=1, 0y<=1$)," Journal of the Electrochemical Society, 2002, 149, (11), A1414-A1418.

Koichi, N., et al., Mitsui Mining & Smelting Co Ltd, Sep. 12, 2003, "Preparation Method of Iron-Containing Olivin Manganese Lithium Phosphate and Battery Using the Same", Machine Translation.

\* cited by examiner a) stoichiometric surface

○ metal ion    ⊗ phosphate ion b) partially phosphate terminated surface c) fully phosphate terminated surface d) partially diphosphate terminated surface a) stoichiometric surface bulk crystal b) phosphate terminated surface bulk crystal a) metal hydroxide terminated surface b) phosphate terminated surface

LITHIUM MANGANESE PHOSPHATE/CARBON NANOCOMPOSITES AS CATHODE ACTIVE MATERIALS FOR SECONDARY LITHIUM BATTERIES

CROSS REFERENCE TO RELATED APPLICATIONS

The present application is a divisional application of U.S. Ser. No. 12/922,639 filed Sep. 22, 2010, now U.S. Pat. No. 8,784,694, which is a 371 of PCT/IB09/51560 filed Apr. 14, 2009, which claims the benefit of PCT/IB2008/051418 filed Apr. 14, 2008.

FIELD OF THE INVENTION

The invention relates to a lithium manganese metal phosphate/carbon nanocomposite as cathode material for rechargeable electrochemical cells.

STATE OF THE ART

Rechargeable batteries of high energy density and long lifetime based on the reversible intercalation of lithium into certain materials have enabled the wide distribution of light and compact electronic devices, such as mobile phones and portable computers. However, the use of certain cathode materials, such as $LiCoO_2$, has given rise to concerns because of the toxicity of cobalt and the danger of fire and explosion due to oxygen liberation and violent reaction with the organic electrolyte on overcharging or at elevated temperature (thermal runaway). Moreover cobalt is a rather rare and hence expensive element. Other materials, such as $LiMn_2O_4$ suffer from poor long term stability.

Lithium metal phosphates with olivine structure have emerged as a promising alternative as cathode materials, since the oxygen is strongly covalently bound in $PO_4^{3-}$, preventing the release of oxygen even under extreme conditions. In addition the inductive effect of $PO_4^{3-}$ raises the redox potential of the metal centre, rendering the use of abundant and cheap metals such as iron and manganese possible. Thus, $LiFePO_4$ yields a voltage of 3.4 V against lithium and remains stable over thousands of charge/discharge cycles, even upon overcharge and at elevated temperature. $LiMnPO_4$ gives an even higher voltage of 4.1 V against lithium, which is near the stability limit of common non-aqueous electrolytes and more compatible with classic systems, such as $LiCoO_2$, $LiAl_{0.05}Co_{0.15}Ni_{0.8}O_2$ or $LiMn_2O_4$. Thanks to the higher voltage $LiMnPO_4$ offers a superior energy density to $LiFePO_4$, which is important for many applications, especially battery electric vehicles.[1] However, only solid solutions $LiMn_yFe_{1-y}PO_4$ were reported to be electrochemically active.[2-4] Still, the capacity of $LiMn_{0.5}Fe_{0.5}PO_4$ was limited to 80 mAh/g, which is less than half the theoretical capacity of 170 mAh/g.

Almost full capacity has been reported for $LiMnPO_4$ and $Li_{1-x}Mn_yFe_{1-y}PO_4$ prepared by ball milling of the precursors ($MnCO_3$, $FeC_2O_4 \cdot 2H_2O$, $NH_4H_2PO_4$ and $Li_2CO_3$) with acetylene black and subsequent firing under inert gas atmosphere.[5-16] It was claimed that this results in a grain size of $Li_{1-x}Mn_yFe_{1-y}PO_4$ not larger than 10 μm, with the BET specific surface area not being less than 0.5 m²/g.[5,6,8-10,15] At a carbon content of 10% and a current density of 0.28 mA/cm², a capacity of 164 mAh/g was reported for a Mn content of y=0.75.[16] Unfortunately, neither the charge/discharge rate nor the loading of active electrode material were indicated by the authors, but assuming a typical loading of 34 mg/cm² cited in their patent application[15] a current density of 0.28 mA/cm² corresponds to 8.2 mA/g, or a C-rate of C/20 (that is a charge/discharge time of 20 hours).

The poor electrochemical performance of $LiMnPO_4$ and $LiMn_yFe_{1-y}PO_4$ has been attributed to their extremely low electronic and ionic conductivities.[17,18] Many efforts have therefore been undertaken to reduce the particle size to the sub-micrometer scale and coat such nanoparticles with conducting carbon, in order to diminish electric and Li-diffusion resistances by shortening the distances for electron and lithium transport.

Direct precipitation of $LiMnPO_4$ from aqueous medium produced particles down to about 100 nm, which after ball-milling with acetylene black gave reversible capacities of about 70 mAh/g at C/20.[17,19,20] Hydrothermal synthesis of $LiMnPO_4$ produced platelets of 100-200 nm thickness, which after ball-milling with carbon black yielded a reversible capacity of 68 mAh/g at a current density of 1.5 mA/g.[21] Solid-state synthesis of $LiMn_{0.6}Fe_{0.4}$ by ball-milling followed by in situ carbon coating through pyrolysis of polypropylene produced 100-200 nm particles and an initial discharge capacity of 143 mAh/g at C/10.[22] Sol-gel synthesis of $LiMnPO_4$ produced particles of 140-220 nm, which were reduced to 90-130 nm by ball-milling with acetylene black and yielded 134 mAh/g at C/10.[23-25] Nanoparticles of $LiMnPO_4$ of 20-100 nm were obtained by a polyol process, which after ball-milling with acetylene black gave a capacity of about 120 mAh/g at C/10.[26,27] In conclusion good rate performance, i.e. high capacity at higher C-rates has still not been reported.

Rate performance is essential for high power applications, such as electric vehicles. Various physical parameters are expected to be responsible for poor kinetics and fast aging of Mn-rich LMFP, including: the large lattice mismatch at the interface between lithiated and delithiated phase; and the Jahn-Teller lattice distortion associated with $Mn^{3+}$.[13,28-33] Indeed, Kopeć et al.[34] reported recently that the $Mn^{3+}$-ions in excess of a critical concentration of 60% undergo transition to the low-spin state, which should renders delithiation (charging) very difficult. In addition, first-principles calculations of the surface redox potentials of LMP indicate a large difference between the Li redox potential in the (010) surface layers and the bulk, which creates a high energy barrier for Li in the bulk to diffuse out of the particle, which, if correct, would render initiation and charging of the material impossible.[35]

It has been demonstrated that the presence of a metal oxide interface layer between the $LiMnPO_4$ material, and the carbon layer improved electrochemical performance, and close to theoretical capacity was observed at low rates.[26,27]

In specific, the presence of a manganese oxide interface layer between the $LiMnPO_4$ material, and the carbon layer improved electrochemical performance. The metal oxide interface layer between $LiMnPO_4$ and carbon can be detected by Raman spectroscopy. A 633 nm exitation wavelength was used to observe the highest relative intensity of metal oxide bands compared with phosphate bands. The close resemblance of its peak pattern to hausmannite is evident.[26,27] Lower symmetry and/or presence only in a thin layer on the LMP-carbon interface can be also responsible for some peak broadening and downshifting compared to Hausmannite. The sharpness of the Mn—O bands in LMP without Mn-oxalate even at lower laser power indicates that this manganese oxide has not been generated by the laser-induced heating.

The manganese oxide layer is shown to be either $Mn_3O_4$ (haussmanite), $\beta$-$MnO_2$ (pyrolusite), MnO (manganosit), MnOOH (groutit) or $Mn1.85O.6H_2O$ (birnessite).[26,27] The method to prepare the manganese oxide interface layer required a ready-made LiMnPO$_4$ and milled together with a carbon source.[26, 27] In no cases were pre-cursors of LiMnPO$_4$ and carbon or a pre-cursor of carbon were milled to form in-situ both the LiMnPO$_4$ and the manganese oxide interface layer between the LiMnPO$_4$ material, and the carbon layer.

According to the state of the art lithium metal phosphates LiMPO$_4$ should contain metals M and phosphate PO$_4$ in stoichiometric ratio M/PO$_4$=1 in order to form a pure single phase material. Any deviations from nominal stoichiometry generally result in the formation of undesirable impurity phases.

DESCRIPTION OF THE INVENTION

The invention relates to a new nanocomposite of lithium manganese phosphate, and a process for manufacturing such a nanocomposite, as defined in the independent claims.

Preferred embodiments of the invention are defined in the dependent claims.

According to the present invention good capacity even at high C-rate is obtained with a nanocomposite of lithium manganese phosphate with general formula Li$_x$Mn$_y$M$_{1-y}$(PO$_4$)$_z$/C where M is at least one other metal (e.g. Fe, Ni, Co, Cr, V, Mg, Ca, Al, B, Zn, Cu, Nb, Ti, Zr, La, Ce, Y) and x=0.8-1.1 and y=0.5-1.0 and z=0.9<z<1.1 with a carbon content of 0.5 to 20% by weight. Part of the oxygen atoms O may be substituted by fluorine F or part of the phosphate ions PO$_4^{3-}$ may be substituted by silicate ions SiO$_4^{4-}$, sulfate ions SO$_4^{2-}$, vanadate ions VO$_4^{3-}$ or borate ions BO$_3^{3-}$.

The nanocomposite according to the invention is produced by milling of suitable precursors of Li$_x$Mn$_y$M$_{1-y}$(PO$_4$)$_z$ with electro-conductive carbon black having a specific surface area of at least 80 m$^2$/g, or with activated-carbon having a specific surface area of at least 200 m$^2$/g, or with graphite having a specific surface area of at least 9.5 m$^2$/g. The reactive milling can be made under inert or reducing atmosphere or direct under air atmosphere, the rest of oxygen will be rapidly consumed by the carbon. To avoid oxidation of metals addition of antioxidant as vitamins C or a reducing agent can be applied.

Milling breaks covalent bonds in the carbon material and creates highly reactive coordinatively unsaturated carbon atoms (dangling bonds) on the carbon surface with which said precursors can react. This mechanochemical reaction[36-38] results in a nanocomposite of said precursors and carbon, wherein the size of the different domains can be controlled by the amount and type of carbon material as well as by the intensity and duration of milling.

Thermal treatment leads to crystallization of Li$_x$Mn$_y$M$_{1-y}$(PO$_4$)$_z$ already at relatively low temperature due to intimate mixing of the precursors by milling. This low crystallization temperature in combination with the covalently bound carbon prevents crystal growth and results in the small nanoparticle size of Li$_x$Mn$_y$M$_{1-y}$(PO$_4$)$_z$ in intimate contact with conducting carbon required for good rate performance.

Acetylene black has most often been used for the synthesis of LiMPO$_4$/carbon composites by milling.[5-9, 13-15, 39-43] Acetylene black has a BET specific surface area of only about 70 m$^2$/g. Like other conventional carbon blacks of modest specific surface area, including Vulcan XC 72R it consists of fused spherical primary particles (nodules) of about 10-50 nm diameter with onion-shell structure of concentric graphene like outer layers, while the core is more amorphous.[44-46] The compactness and resilience of these nodules renders them rather resistant against breakdown by milling (FIGS. 24 and 25). Therefore the carbon nodules mainly make point-contacts with the nanoparticles of the active material, which results in poor electrochemical performance (FIG. 8) due to the very low conductivity of Li$_x$Mn$_y$M$_{1-y}$(PO$_4$)$_z$. This is different from the less insulating LiFePO$_4$, where point-contacts between small enough particles and carbon black have been reported to be sufficient for good performance.[47] This explains why acetylene black yields only poor rate performance (FIG. 8).

Conductive carbon blacks with high specific surface area according to the present invention are for example the furnace blacks Printex® XE 2 (Evonik Degussa) with 950 m$^2$/g and fused carbon nodules of about 30 nm diameter, as well as Black Pearls® 2000 (Cabot) with 1500 m$^2$/g and 15 nm particle diameter. The much higher specific surface area as compared to acetylene black in spite of the similar nodule size is due to a more open, porous structure of these nodules, rendering them much more fragile against milling. Therefore milling not only breaks the chains of fused carbon nodules but also disrupts the graphene like shells of the nodules, creating dangling bonds for reaction with the Li$_x$Mn$_y$M$_{1-y}$(PO$_4$)$_z$ precursors.

Ketjenblack® (Akzo Nobel) is another conductive carbon black of high specific surface area (600-1400 m$^2$/g). It is obtained as by-product in the synthesis of ammonia and has a fused broken egg-shell structure, which arises from removal of the inner amorphous part of the carbon black nodules by partial combustion.[46, 48] These shells of about 20 nm outer diameters have a thickness of a few graphene layers only and thus are easily broken by milling, which results in a intimate large-area contact with the active material (FIG. 23).

Activated carbons are another class of conductive carbon of high specific surface area (200-3000 m$^2$/g), examples include Norit® DLC Super 50. It is obtained via the reactive removal of the inner amorphous part of the carbon by an activation process, creating a pore network. The fragile and brittle nature of the porous residual renders it easily broken by milling, the high surface area results in a intimate large-area contact with the active material.

Graphitic nano-sheets can also be obtained by milling of graphite.[49-60] Natural as well as synthetic graphite consists of stacked graphene sheets, which are bound by week van der Waals forces only, and hence are easily separated by sheer forces during milling. This produces thinner graphene stacks which are more easily broken within the graphene planes by further milling, creating highly reactive dangling bonds at the freshly created edges. The milling time can be reduced by using expanded graphite, in which the graphene sheets have already been partially separated by chemical intercalation and thermal expansion. To reduce the milling time even further multiple or single sheet graphene can also be prepared by oxidation of graphite and subsequent exfoliation.[61]

Breaking of carbon-carbon bonds by milling creates highly reactive coordinatively unsaturated carbon atoms (dangling bonds).[62-65] This freshly created carbon surface can react with the other precursors present in the mill.

For the solid state synthesis of LiMnPO$_4$ by mechanochemical reaction the use of manganese(II)carbonate, ammonium di-hydrogen-phosphate and lithium carbonate has been reported:[5-12, 16, 66]

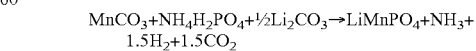

According to the present invention the liberation of toxic, corrosive and flammable NH$_3$ during milling can be avoided with lithium-di-hydrogen-phosphate:

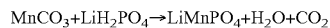

This also reduces the amount of water and carbon dioxide produced by 50%. Water as byproduct may be avoided completely by employing lithium metaphosphate:

$$MnCO_3 + LiPO_3 \rightarrow LiMnPO_4 + CO_2$$

Solid solutions with lithium iron phosphate can be obtained with e.g. iron oxalate:

$$yMnCO_3 + (1-y)FeC_2O_4 \cdot 2H_2O + LiH_2PO_4 \rightarrow LiMn_yFe_{1-y}PO_4 + (3-2y)H_2O + (3-2y)CO_2$$

Other lithium metal phosphates and their solid solutions can be synthesized accordingly from the appropriate precursors. Instead of metal carbonates or oxalates any other suitable metal source can be used, such as oxides (e.g. MnO, $Mn_2O_3$, $MnO_2$, $Fe_3O_4$, $Fe_2O_3$), hydroxides, salts with carboxylic acids (e.g. acetates) or hydroxyl carboxylic acids (e.g. glycolates, lactates, citrates, tartrates). Other lithium salts can be employed instead of $LiH_2PO_4$ or $LiPO_3$, such as $Li_2O$, LiOH or $Li_2CO_3$. Phosphate ions can also be introduced from phosphoric acid ($HPO_3$ or $H_3PO_4$), as well as any phosphate salt, as long as the byproducts do not degrade the main product.

The water vapor produced by the mechanochemical reaction can dissociatively react with the freshly created carbon surface arising from disruption of carbon-carbon bonds by milling, resulting in a hydroxylation of the coordinatively unsaturated carbon atoms:

$$2\text{carbon-C.} + H_2O \rightarrow \text{carbon-C—OH} + \text{carbon-C—H}$$

Subsequently these hydroxyl groups can react with transition metal M=Mn or M or phosphate ions:

$$\text{carbon-C—OH} + M^{2+} \rightarrow \text{carbon-C—O-M}^+ + H^+$$

$$\text{carbon-C—OH} + H_2PO_4^- \rightarrow \text{carbon-C—O—PO}_3H^- + H_2O$$

The coordinatively unsaturated carbon atoms created by milling can also react directly with the metal salt or phosphate ions:

$$\text{carbon-C.} + MCO_3 \rightarrow \text{carbon-C—O-M}^+ + CO_2$$

$$\text{carbon-C.} + H_2PO_4^- \rightarrow \text{carbon-C—O—PO}_3H^- + H^+$$

Through these chemical reactions of the $Li_xMn_yM_{1-y}(PO_4)_z$ precursors with the carbon surface nucleation centers are created for the growth of covalently bound, amorphous $Li_xMn_yM_{1-y}(PO_4)_z$ by further mechanochemical reaction. On a carbon of very high specific surface area (as obtained by milling with high surface area carbon black or graphite) the amorphous $Li_xMn_yM_{1-y}(PO_4)_z$ is very finely dispersed resulting in a nanocomposite of very small particle size after crystallization treatment and large-area electric contact with conductive carbon, which is crucial for good rate performance. Covalent binding of $Li_xMn_yM_{1-y}(PO_4)_z$ to carbon through oxygen bridges (C—O-M or C—O—P) also improves the electric contact of the cathode active material with the current collector of the battery, which again is important to achieve high current densities. A stoichiometric excess of transition metal precursor during milling favors formation of a metal oxide bonding layer (C—O-M) between carbon and $LiMPO_4$, while an excess of phosphate favors bonding by phosphate groups (C—O—P).

The presence of covalent bonds between $Li_xMn_yM_{1-y}(PO_4)_z$ and carbon can be shown by different analytical techniques, such as infrared (FTIR) and Raman spectroscopy, or X-ray spectroscopy (e.g. XAFS, XANES, XPS). For example the formation of an intermediate manganese oxide bonding layer by ball-milling of nanocrystalline $LiMnPO_4$ with Ketjenblack® in presence of a small amount of water has been revealed by Raman spectroscopy.[27]

Due to the intimate mixing of the $Li_xMn_yM_{1-y}(PO_4)_z$ precursors by milling on the nanometer scale crystallization occurs already at moderate temperature (around 400° C.). The low thermal diffusivity at such a low crystallization temperature results in the formation of very small nanocrystals. In addition, crystal growth is inhibited by the covalently bound carbon in the nanocomposite, which reduces the diffusivity even more. Hence a $Li_xMn_yM_{1-y}(PO_4)_z$/carbon nanocomposite with nanocrystalline $Li_xMn_yM_{1-y}(PO_4)_z$ of less than about 100 nm crystallite size and intimate contact between nanocrystalline active material and conductive carbon is formed, which is a premise for excellent electrochemical performance.

The primary particle size of $Li_xMn_yM_{1-y}(PO_4)_z$ in the nanocomposite can be determined by electron microscopy (SEM or TEM). The crystallite size of $Li_xMn_yM_{1-y}(PO_4)_z$ can be calculated from the X-ray diffraction line broadening with the Scherrer equation, or more accurately with the Warren-Averbach method or by Rietveld refinement, in order to take into account the contribution of lattice strain to line broadening.

The relative mass of carbon required to obtain an average carbon coating thickness t on spherical lithium metal phosphate particles of average radius r is given by:

$$M_{carbon}/M_{LiMPO4} = \rho_{carbon}/\rho_{LiMPO4} \cdot [(1+t/r)^3 - 1]$$

For r=20 nm and t=1 nm with $\rho_{carbon}=2.2$ g/cm$^3$ and $\rho_{LiMPO4}=3.5$ g/cm$^3$:

$$M_{carbon}/M_{LiMPO4} = 0.1$$

Hence for spherical $LiMn_yM_{1-y}(PO_4)_z$ particles of 40 nm average diameter and a continuous dense carbon coating of 1 nm mean thickness 10 wt % carbon with respect to the mass of $LiMn_yM_{1-y}(PO_4)_z$ would be required. The necessary amount would be higher for non-spherical particles since a sphere has the smallest surface area for a given volume. It would be lower for bigger $Li_xMn_yM_{1-y}(PO_4)_z$ particles or a thinner or discontinuous or less dense carbon coating.

Carbon exhibits higher electric conductivity when being in its graphite modification (sp$^2$ hybridized carbon) and within the two-dimensional basal graphene planes. Hence for good electric conductivity of the carbon network in the nanocomposite a large fraction and sufficient extension of these graphitic domains with sp$^2$ carbon is preferred. Since the low heat treatment temperature of 350-600° C. is not sufficient to cause any graphitization a high graphene fraction is advantageously already present in the carbon additive before milling.

According to the present invention this is achieved by employing electro-conductive carbon black of high surface area, such as Printex® XE 2 (Evonik Degussa), Black Pearls® 2000 (Cabot) or Ketjenblack® (Akzo Nobel), graphite with specific surface area of at least 9.5 m$^2$/g, expanded graphite, graphene, or activated carbon. The fraction and size of well conducting graphene domains in the nanocomposite obtained by milling can be determined by different analytical techniques, such as Raman spectroscopy (ratio of graphene G-band around 1580 cm$^{-1}$ and disorder D-band around 1360 cm$^{-1}$)[67, 68], X-ray and neutron diffraction, as well as electron microscopy (TEM).

The invention provides an electroactive lithium manganese phosphate material ($LiMnPO_4$) or solid solution $Li_xMn_yM_{1-y}(PO_4)_z$ (where M is at least one other metal (e.g. Fe, Ni, Co, Cr, V, Mg, Ca, Al, B, Zn, Cu, Nb, Ti, Zr, La, Ce, Y) and x=0.8-1.1 and y=0.5-1.0 and z=0.9<z<1.1) characterized in that it comprises a Metal oxide layer on the $LiMnPO_4$ material, respectively the LiMn$_y$M$_{x1-y}$PO$_4$ material. The oxide described above is between the LiMnPO$_4$ material, respectively the Li$_x$Mn$_y$M$_{1-y}$(PO$_4$)$_z$ material, and a conductive additive such as carbon. The presence of the oxide layer is demonstrated by Raman spectroscopy.

In contrast to other methods to prepare manganese oxide interface layer between the Li$_x$Mn$_y$M$_{1-y}$(PO$_4$)$_z$ material, and the carbon layer, this novel method prepares both the Li$_x$Mn$_y$M$_{1-y}$(PO$_4$)$_z$ material and the interface layer in-situ from precursors of Li$_x$Mn$_y$M$_{1-y}$(PO$_4$)$_z$.

It has been demonstrated that the presence of a manganese oxide interface layer between the LiMnPO$_4$ material, and the carbon layer improved electrochemical performance.

The manganese oxide layer is shown to be either Mn$_3$O$_4$ (haussmanite), β-MnO$_2$ (pyrolusite), MnO (manganosit), MnOOH (groutit) or Mn1.85O.6H$_2$O (birnessite). The method to prepare the manganese oxide interface layer required a ready-made LiMnPO$_4$ and milled it with a carbon source. In no cases were pre-cursors of LiMnPO$_4$ and carbon milled to form in-situ both the LiMnPO$_4$ and the manganese oxide interface layer between the LiMnPO$_4$ material, and the carbon layer.

According to the state of the art lithium metal phosphates LiMPO$_4$ should contain metals M and phosphate PO$_4$ in stoichiometric ratio M/PO$_4$=1 in order to form a pure single phase material. Any deviations from nominal stoichiometry generally result in the formation of impurity phases that diminish electrochemical performance.

Surprisingly we found that significant stoichiometric excess 1-10% of phosphate can be accommodated in the case of nanocrystalline LiMPO$_4$ without loss in performance. This is achieved, by for example adding a stoichiometric excess of LiH$_2$PO$_4$ as a reactant. Due to the very high specific surface area of nanocrystalline LiMPO$_4$ excess phosphate is incorporated into the crystal surface and forms a phosphate terminated surface. Such a phosphate termination can offer several advantages (FIGS. 15 to 17):

1. Phosphate termination favours formation of strong bonds between carbon coating and lithium metal phosphate: this results in better adhesion and electric contact.

2. Phosphate termination protects the metal ions Mn and M from oxidation during handling of the material in air.

3. Phosphate termination prevents exposure of the metal ions Mn and M to the electrolyte and thus their dissolution and subsequent reduction at the anode, which results in enhanced stability at elevated temperature.

4. Phosphate termination reduces catalytic oxidation of the electrolyte by avoiding direct contact with the transition metal ions Mn and M, which improves stability at high voltage and temperature.

Calculation of Phosphate Excess:

The molar phosphate excess required for complete phosphate termination of a spherical lithium metal phosphate particle of radius r can be calculated from basic geometry as $$\frac{n_{surface}}{n_{volume}} = \frac{3}{r} \cdot \sqrt[3]{\frac{M}{\rho \cdot N_A}}$$

with $n_{surface}$=average number of lithium metal phosphate formula units in the particle surface
$n_{volume}$=number of lithium metal phosphate formula units in the particle volume
r=particle radius
M=molar mass of lithium metal phosphate
ρ=density of particle
$N_A$=Avogadro's number.

For example in the case of a spherical LiMn$_{0.8}$Fe$_{0.2}$PO$_4$ nanoparticle of 50 nm diameter: r=25 nm, M=158 g/mol, ρ=3.4 g/cm$^2$ gives $n_{surface}/n_{volume}$=0.05 Hence a phosphate excess of 5 mol % would be necessary for complete phosphate termination of this nanoparticle.

Since the real lithium metal phosphate powder consists of non-spherical particles with a distribution of sizes this is only an approximation. The optimum phosphate excess has to be determined experimentally. Too low phosphate excess results in partial phosphate termination where part of the transition metal ions remain exposed at the surface (FIG. 15b). This will not offer the full advantages of a complete phosphate termination (FIG. 15c). On the other hand too large phosphate excess will form a thicker layer with diphosphate (FIG. 15d) or higher phosphate oligomers on the particle surface. This impedes both electron exchange with the carbon coating and lithium exchange with the electrolyte and thereby degrades battery performance at high charge or discharge rate.

FIG. 18 shows the electrochemical performance of a lithium battery with Li$_{1.04}$Mn$_{0.8}$Fe$_{0.2}$(PO$_4$)$_{1.04}$/10% C nanocomposite containing 4% excess lithium phosphate (Example 7).

Increasing the phosphate excess in the material to 10% results in the appearance of new crystalline phases, such as Li$_2$P$_2$O$_7$ and other polyphosphates, which can be detected by X-ray diffraction (FIG. 19). These new crystalline phases may have benefits including improved electrochemical stability, but may have a reduced electrochemical capacity.

EXAMPLES

Example 1

Synthesis of LiMnPO$_4$/C Nanocomposite

A mixture of 3.45 g MnCO$_3$ (Aldrich 99.9%)+3.12 g LiH$_2$PO$_4$ (Aldrich 99%)+1 g Ketjenblack® EC600JD (Akzo Nobel) was milled in a hardened steel container of 250 mL capacity with 12 hardened steel balls of 20 mm diameter in a planetary ball mill (Retsch PM 100) at 500 rpm for 2 hours. The obtained powder was heated up to 450° C. within 30 minutes and maintained at this temperature for 1 hour under a stream of argon+8% hydrogen.

Example 2

Synthesis of LiMn$_{0.9}$Fe$_{0.1}$PO$_4$/C Nanocomposite (18% Ketjenblack®)

A mixture of 3.105 g MnCO$_3$ (Aldrich 99.9%)+0.54 g FeC$_2$O$_4$. 2 H$_2$O (Fluka 99%)+3.12 g LiH$_2$PO$_4$ (Aldrich 99%)+1 g Ketjenblack® EC600JD was milled as described in Example 1 and heated at 350, 450 or 550° C. for 1 hour under argon+8% hydrogen. FIG. 1 shows a scanning electron microscope picture of the nanocomposite obtained at 450° C., indicating a primary particle size in the order of 50 nm for the brighter LiMn$_{0.9}$Fe$_{0.1}$PO$_4$ component.

FIG. 2 shows the X-ray diffraction patterns of the three samples, indicating poor crystallization after 1 hour at 350° C., while the sample heated for the same time at 450° C. is well crystallized LiMn$_{0.9}$Fe$_{0.1}$PO$_4$ without any apparent impurities. From the line broadening an average crystallite size of 60 nm with negligible strain was calculated with the Warren-Averbach method. This agrees with the primary particle size in the order of 50 nm observed in the SEM picture (FIG. 1).

TABLE 1

| Lattice parameters | $LiMn_{0.8}Fe_{0.2}PO_4$/ 10% Ketjenblack EC600JD | $LiMn_{0.8}Fe_{0.2}PO_4$ (Yamada 2001) | Reference $LiMnPO_4$ | Reference $LiFePO_4$ |
|---|---|---|---|---|
| a | 10.419 Å | 10.44 Å | 10.446 Å | 10.34 Å |
| b | 6.079 Å | 6.09 Å | 6.103 Å | 6.01 Å |
| c | 4.731 Å | 4.736 Å | 4.744 Å | 4.692 Å |
| V | 299.70 Å$^3$ | 301.6 Å$^3$ | 302.44 Å$^3$ | 291.6 Å$^3$ |

Example 3

Synthesis of $LiMn_{0.8}Fe_{0.2}PO_4$/10% C Nanocomposites with Different Carbon Materials A mixture of 2.76 g $MnCO_3$ (Aldrich 99.9%)+1.08 g $FeC_2O_4$.2 $H_2O$ (Fluka 99%)+3.12 g $LiH_2PO_4$ (Aldrich 99%)+0.5 g carbon was milled and heat treated as described in Example 1.
Following carbon materials were compared:
Ketjenblack® EC-300J (Akzo Nobel, 800 m$^2$/g)
Ketjenblack® EC-600JD (Akzo Nobel, 1400 m$^2$/g)
Printex®. XE 2 (Degussa, 950 m$^2$/g)
Black Pearls® 2000 (Cabot, 1500 m$^2$/g)
Shawinigan acetylene black C-55 (70 m$^2$/g)
Vulcan XC 72R (270 m$^2$/g)
Multi walled carbon nanotubes (MWCNT)
High surface graphite Timrex® HSAG300 (Timcal, 280 m$^2$/g)
Timrex® KS4 graphite (Timcal, 26 m$^2$/g)
Timrex® KS6 graphite (Timcal, 20 m$^2$/g)
Timrex® SFG6 graphite (Timcal, 17 m$^2$/g)
Timrex® MB 15 graphite (Timcal, 9.5 m$^2$/g)
Norit® DLC Super 50 activated carbon (Norit, 1600 m$^2$/g).

Example 4

Synthesis of $LiMn_{0.8}Fe_{0.2}PO_4$/10% C Nanocomposites with a Combination of Carbon Materials A mixture of 5.52 g $MnCO_3$ (Aldrich 99.9%)+2.16 g $FeC_2O_4$.2 $H_2O$ (Fluka 99%)+6.24 g $LiH_2PO_4$ (Aldrich 99%)+0.8 g Cellulose (Aldrich, microcrystalline)+0.4 g Ketjenblack® EC600JD (Akzo Nobel)+0.4 g Timrex® SFG 44 graphite (Timcal) was milled in a hardened steel container of 250 mL capacity with 12 hardened steel balls of 20 mm diameter in a planetary ball mill (Retsch PM 100) at 500 rpm for 2 hours. The obtained powder was heated up to 600° C. within 10 minutes and maintained at this temperature for 20 minutes under a stream of argon.

Example 5

Synthesis of $LiMn_{0.9}V_{0.05}(PO_4)_{0.9}(VO_4)_{0.05}$/10% C Nanocomposite

A mixture of 6.21 g $MnCO_3$ (Aldrich 99.9%)+0.636 g $LiVO_3$ (Alfa Aesar 99.9%)+5.62 g $LiH_2PO_4$ (Aldrich 99%)+1 g Ketjenblack® EC600JD was milled in a hardened steel container of 250 mL capacity with 12 hardened steel balls of 20 mm diameter in a planetary ball mill (Retsch PM 100) at 400 rpm for 2 hours. The obtained powder was heated up to 500° C. within 10 minutes and maintained at this temperature for 20 minutes under a stream of argon.

Example 6

Synthesis of $LiMn_{0.9}Ti_{0.1}PO_4$/10% C Nanocomposite

A mixture of 6.21 g $MnCO_3$ (Aldrich 99.9%)+1.77 g $(NH_4)_2TiO(C_2O_4)_2.H_2O$ (Aldrich 99.998%)+6.24 g $LiH_2PO_4$ (Aldrich 99%)+1 g Ketjenblack® EC600JD was milled in a hardened steel container of 250 mL capacity with 12 hardened steel balls of 20 mm diameter in a planetary ball mill (Retsch PM 100) at 400 rpm for 2 hours. The obtained powder was heated up to 500° C. within 10 minutes and maintained at this temperature for 20 minutes under a stream of argon.

Example 7

Synthesis of $Li_{1.04}Mn_{0.8}Fe_{0.2}(PO_4)_{1.04}$/10% C Nanocomposites with 4% Excess Lithium Phosphate A mixture of 2.62 g $MnCO_3$ (Aldrich 99.9%)+1.08 g $FeC_2O_4$.2 $H_2O$ (Fluka 99%)+3.12 g $LiH_2PO_4$ (Aldrich 99%)+0.5 g Timrex SFG 6L graphite (Timcal) was milled and heat treated as described in Example 1.
FIG. 21. trace c and d show the Raman spectra of samples prepared with 5 and 10% excess of $LiH_2PO_4$ described in Experiment 7 respectively. They are compared to an equivalent material prepared with no phosphate excess (curve b) as per in example 3). Excitation wavelength 633 nm. The change in spectra versus curve b example 3 is illustrative of a different interface.

Example 8

Preparation of $Li_xMn_yM_{1-y}(PO_4)_z$/C Cathodes and Secondary Lithium Batteries with Such Cathodes 1 g of $LiMn_yFe_{1-y}PO_4$/C nanocomposite as obtained in the above Examples was mixed with 20 mg carbon nano fibers (CNF) and 75 mg PVdF (polyvinylidene difluoride) in NMP (N-methyl-2-pyrrolidinon). This dispersion was doctor bladed on a carbon coated aluminum foil and dried at 120° C. under vacuum. The electrodes were compressed into Ø 23 mm disks with a thickness of about 30 μm and an active material loading of about 3.0 mg/cm$^2$. Cells were assembled in Swagelok™ fittings using Li metal foil as counter electrode with a microporous polymer separator (Celgard 2400™) and an electrolyte of 1M $LiPF_6$ in ethylene carbonate (EC) and dimethyl carbonate (DMC) 1:1 (by volume)+1% VC.
The electrochemical properties of the $LiMn_yFe_{1-y}PO_4$/C electrodes were measured by galvanostatic charge/discharge and cyclic voltammetry with Arbin BT 2000. FIGS. 3, 5, 7 and 8 show the electrochemical performance at different discharging rates. FIGS. 4 and 6 show the stability on cycling at a charge/discharge rate of 1 C.

Example 9

Pure LMP/Carbon was Prepared by Solid State Reaction

A mixture of 3.45 g MnCO3 (Aldrich 99.9%)+3.12 g LiH2PO4 (Aldrich 99%)+1 g Ketjenblack® EC600JD (Akzo Nobel) was milled in a hardened steel container of 250 mL capacity with 12 hardened steel balls of 20 mm diameter in a planetary ball mill (Retsch PM 100) at 500 rpm for 2 hours. The obtained powder was heated up to 450° C. within 30 minutes and maintained at this temperature for 1 hour under a stream of argon+8% hydrogen. Alternatively 20% of $MnCO_3$ was exchanged with Mn-oxalate.

FIG. 20 shows the spectra (Labram HR, Horiba Jobin-Yvon, λ=633 nm) of pure LMP/carbon prepared by solid state reaction as described in example 9, in one case with 20% of Mn-oxalate (curve e and f), in the other case without Mn-oxalate (curve c and d). In each case, two laser powers are used (D0.6 means higher laser power). For comparison, spectra of hausmannite $Mn_3O_4$ (b) and also $MnO_2$ (a).

In all LMP spectra, the band at ca 645 cm-1 is present. It has the highest relative intensity in LMP without Mn-oxalate taken at lower laser power. The same sample measured at a higher laser power shows relatively weak signal of $Mn_3O_4$. The sample prepared with 20% of Mn-oxalate shows very similar spectra under both laser powers. The parameters of the possible Mn—O bands in the sample without Mn-oxalate at lower laser power (spectrum d in FIG. 20) are very close to those of hausmannite in terms of position and FWHM. In the other LMP spectra, these bands are more downshifted and broadened, towards "$MnO_2$" spectrum.

The close resemblance of its peak pattern to hausmannite is evident, albeit not unambiguous. Lower symmetry and/or presence only in a thin layer on the LMP-carbon interface can be also responsible for some peak broadening and downshifting compared to hausmannite. The sharpness of the Mn—O bands in LMP without Mn-oxalate even at lower laser power indicates that this manganese oxide has not been generated by the laser-induced heating.

A partial presence of another Mn-oxide, e.g. bixbyite, (Mn, Fe)$_2$O$_3$, cannot be ruled out. The loss of Mn—O signal with increasing laser power in this sample (without Mn-oxalate) is intriguing, as well as almost the same signal in the other sample (with Mn-oxalate) at both laser powers.

Example 10

A mixture of 2.76 g $MnCO_3$ (Aldrich 99.9%)+1.08 g $FeC_2O_4 \cdot 2 H_2O$ (Fluka 99%)+3.12 g $LiH_2PO_4$ (Aldrich 99%)+0.5 g Ketjenblack® EC600JD was milled as described in Example 1 and heated at 450° C. for 1 hour under argon/H2 atmosphere. A comparative experiment was prepared with the same conditions, except that the same amount of Vulcan XC72R or Shawinigan acetylene black C-55 was used in place of Ketjenblack® EC600JD (Akzo Nobel).

The characterization data and the electrochemical performance are given in Table 2. The electrochemical performance of cathode material prepared with Ketjenblack® EC600JD (Akzo Nobel) is close to theoretical value, whereas the cathode material prepared with Shawinigan acetylene black C-55 show lower electrochemical performance and the material prepared with Vulcan XC72-R is electrochemical inactive.

In FIG. 22 show Raman spectra of these three cathode materials. The $LiMn_yFe_{1-y}PO_4/C$ cathode material prepared with Ketjenblack® EC600JD (Akzo Nobel) show the most intensive hausmannite signal at about 650 nm, while the material $LiMn_yFe_{1-y}PO_4/C$ prepared with Vulcan XC72R does not contain this signal.

TABLE 2

Characterization and electrochemical performance of $LiMn_yFe_{1-y}PO_4/C$ cathode material prepared with Ketjenblack 600, Acetylene black C55 and Vulcan 72R respectively.

| Sample | LiMn0.8Fe0.2PO4 + 10% carbon: | Carbon BET m2/g | Sample BET m2/g | a/Å | b/Å | c/Å | V/Å3 | Cryst. size nm | Capacity @ 1 C. (mAh/g) |
|---|---|---|---|---|---|---|---|---|---|
| v150208 | Ketjenblack EC-600JD | 1400 | 88 | 10.420 | 6.081 | 4.736 | 300.2 | 51 | 132 |
| f26020 | acetylene black C-55 | 70 | 35 | 10.416 | 6.073 | 4.733 | 299.4 | 52 | 99 |
| g150208 | Vulcan XC 72R | 270 | 46 | 10.424 | 6.081 | 4.736 | 300.2 | 47 | 0 |

BRIEF DESCRIPTION OF THE DRAWINGS

The figures are discussed in more detailed manner below.

Mean crystallite size from XRD line broadening L=51 nm BET surface area A=88 m$^2$/g.

Figure 1A:
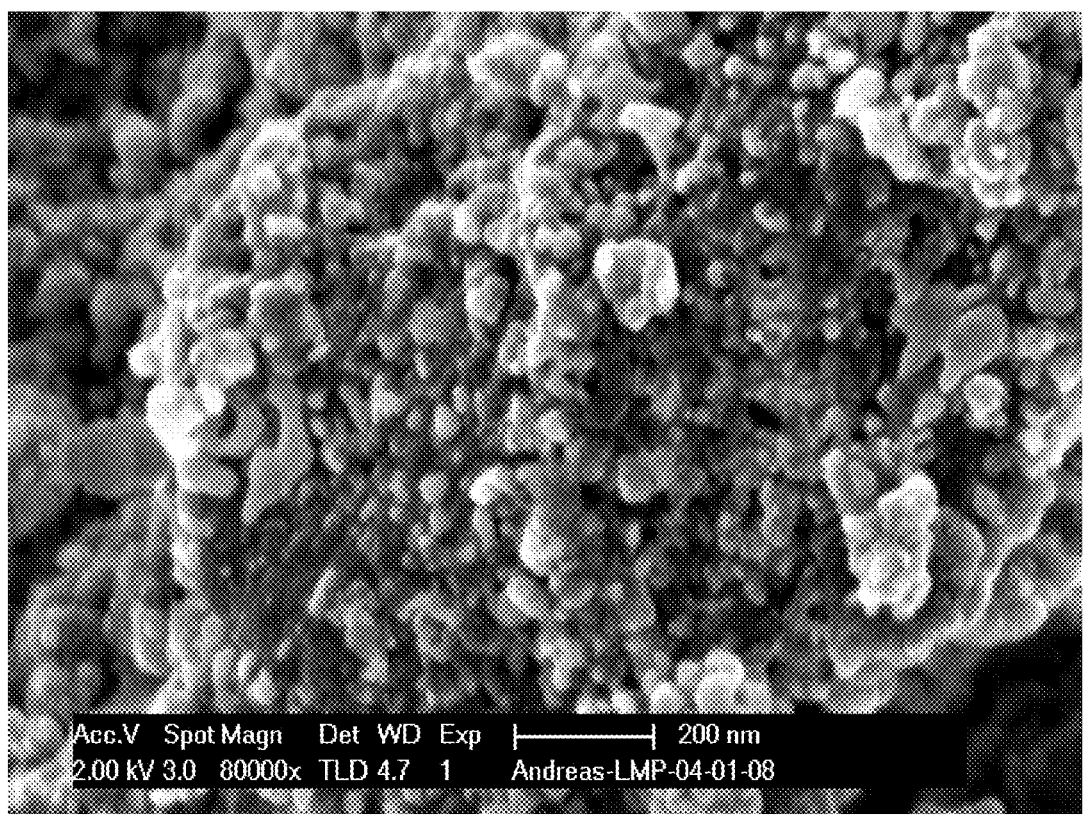
FIG. 1a shows a high resolution scanning electron microscope (HRSEM) picture of the $LiMn_{0.9}Fe_{0.1}PO_4/C$ nanocomposite (18% Ketjenblack EC600JD) according to Example 2 after heating for 1 hour under argon/8% hydrogen at 450° C. The primary particle size is in the order of 50 nm for the brighter $LiMn_{0.9}Fe_{0.1}PO_4$ component.
Figure 1B:
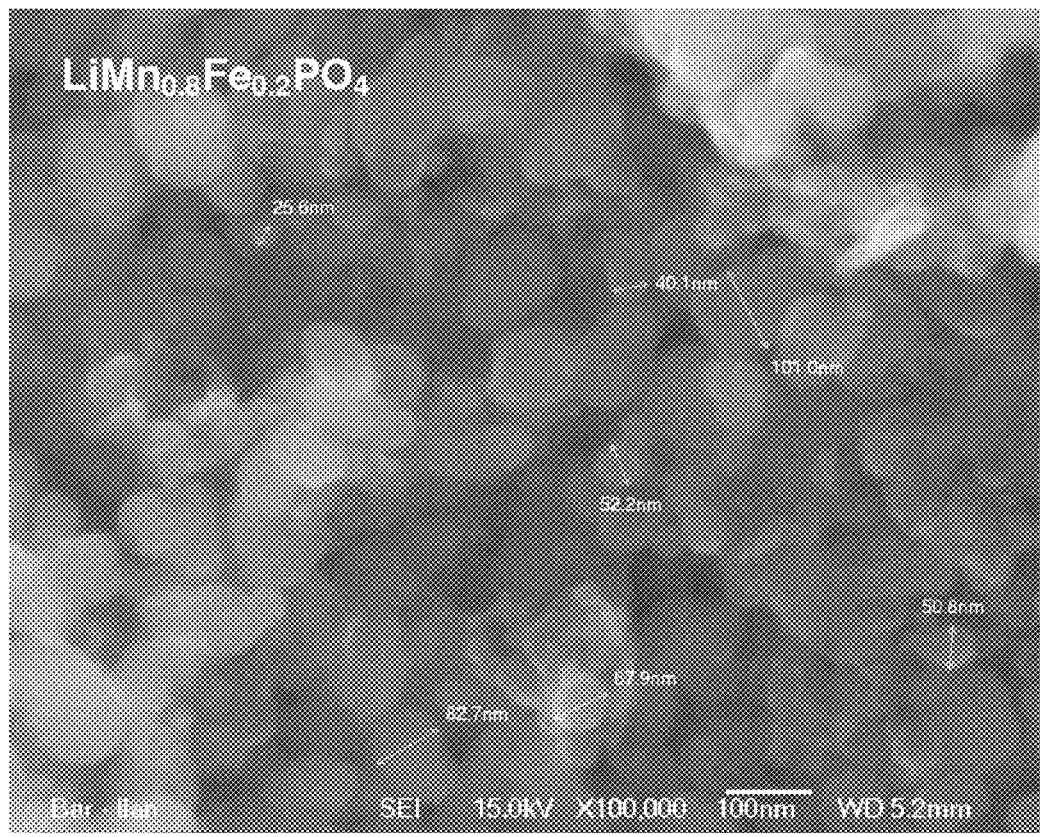
FIG. 1b shows a HRSEM picture of the $LiMn_{0.8}Fe_{0.2}PO_4/C$ nanocomposite (10% Ketjenblack EC600JD) according to Example 3.
Figure 1C:
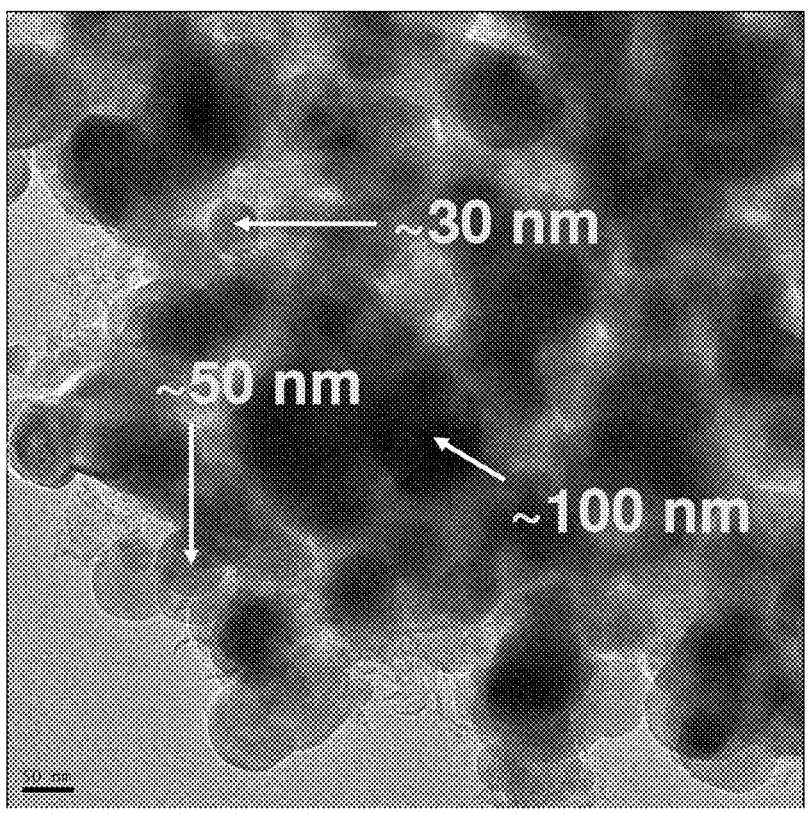
FIG. 1c shows a TEM picture of the $LiMn_{0.8}Fe_{0.2}PO_4/C$ nanocomposite (10% Ketjenblack EC600JD) according to Example 3.
Figure 2A:
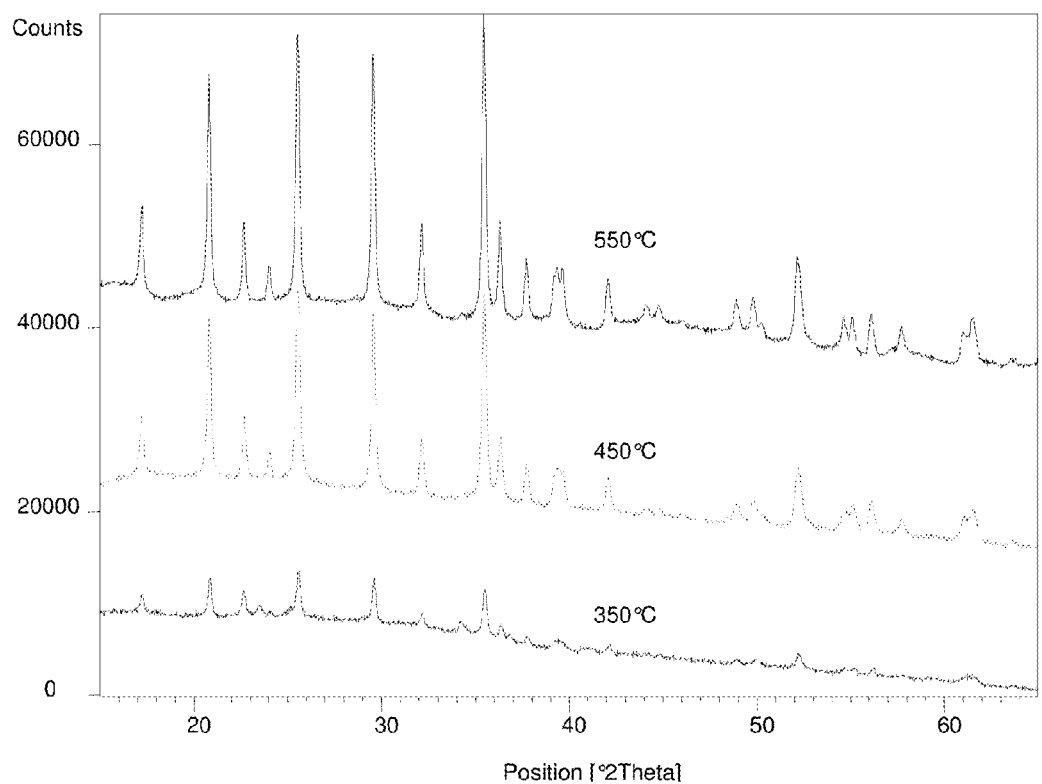
FIG. 2a shows the X-ray diffraction (XRD) patterns of the $LiMn_{0.9}Fe_{0.1}PO_4/C$ nanocomposite (18% Ketjenblack EC600JD) according to Example 2 after heating for 1 hour under argon/8% hydrogen at different temperatures. Only weak XRD peaks are observed after 1 hour at 350° C. indicating poor crystallization, while the sample heated for the same time at 450° C. is well crystallized $LiMn_{0.9}Fe_{0.1}PO_4$ without any apparent impurities. Heating at 550° C. leads to a further increase in the peak intensities and slight reduction in the peak widths. From the line broadening at 450° C. an average crystallite size of 60 nm with negligible strain was calculated with the Warren-Averbach method. This agrees with the primary particle size in the order of 50 nm observed in the SEM picture (FIG. 1).
Figure 2B:
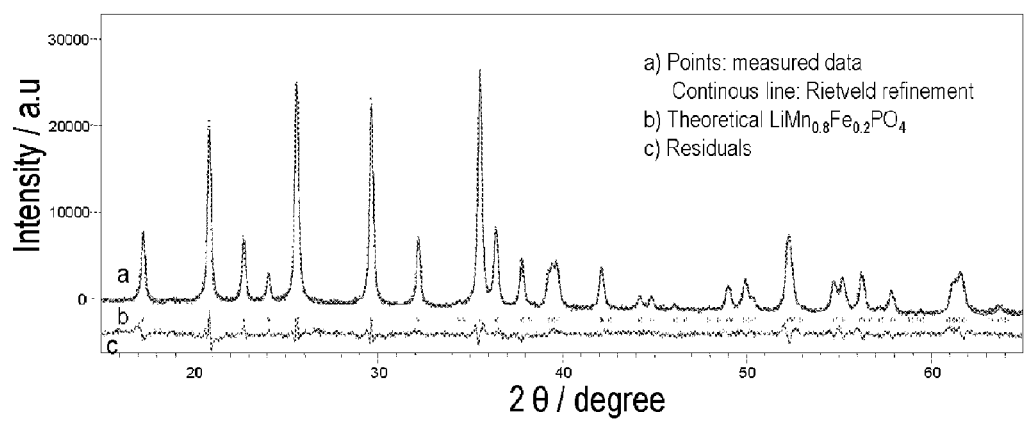
FIG. 2b shows the XRD pattern of the $LiMn_{0.8}Fe_{0.2}PO_4/C$ nanocomposite (10% Ketjenblack EC600JD)) with Rietveld refinement according to Example 3 and Table 1 the crystal data from the XRD pattern.
Figure 3:
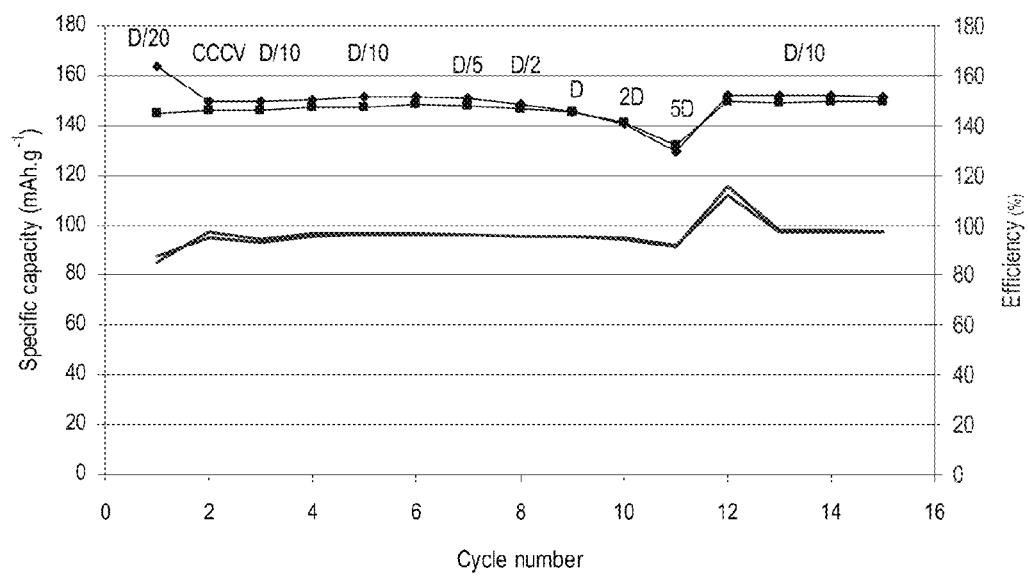

FIG. 3 represents the electrochemical performance of two different lithium batteries with $LiMn_{0.9}Fe_{0.1}PO_4/C$ nanocomposite cathode (18% Ketjenblack EC600JD, Example 2) at different discharge rates on cycling between 2.7 and 4.4 V against lithium. A capacity of 150 mAh/g of active material is achieved at D/10. Even at a discharge rate of 5 D a capacity as high as 130 mAh/g is obtained.

Figure 4:
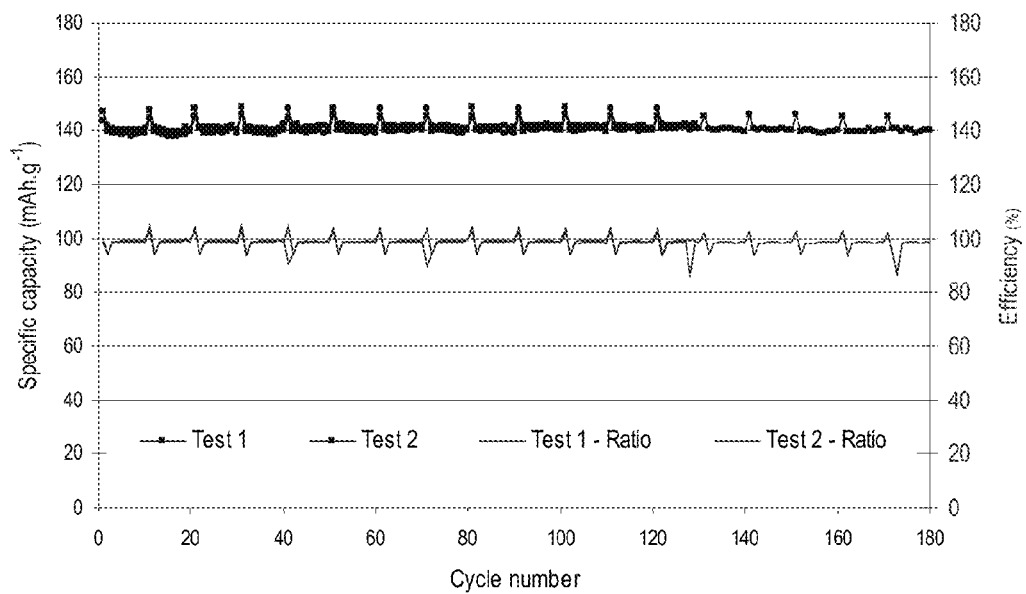

FIG. 4 shows the cycling stability (at 1 C and C/10 each 10th cycle, charged up to 4.25 V) of the lithium batteries from FIG. 3 with $LiMn_{0.9}Fe_{0.1}PO_4/C$ nanocomposite cathode (18% Ketjenblack EC600JD, Example 2).

Figure 5:
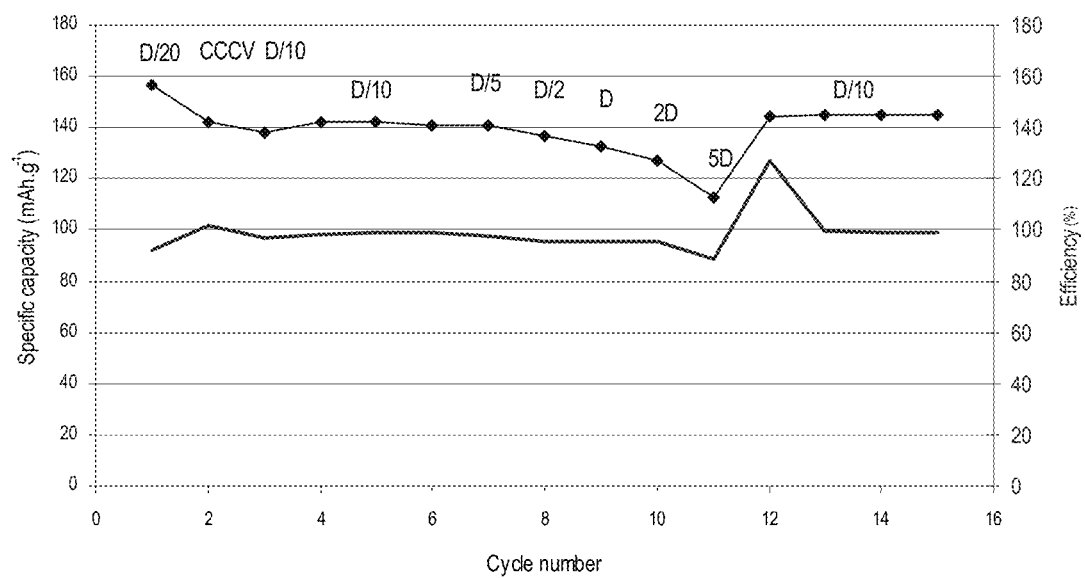

FIG. 5 shows the electrochemical performance of a lithium battery with $LiMn_{0.8}Fe_{0.2}PO_4/C$ nanocomposite cathode (10% Ketjenblack EC600JD, Example 3) at different discharge rates on cycling between 2.7 and 4.4 V against lithium. A capacity of 145 mAh/g of active material is obtained at D/10. At a discharge rate of 5 D the capacity is still higher than 110 mAh/g.

Figure 6A:
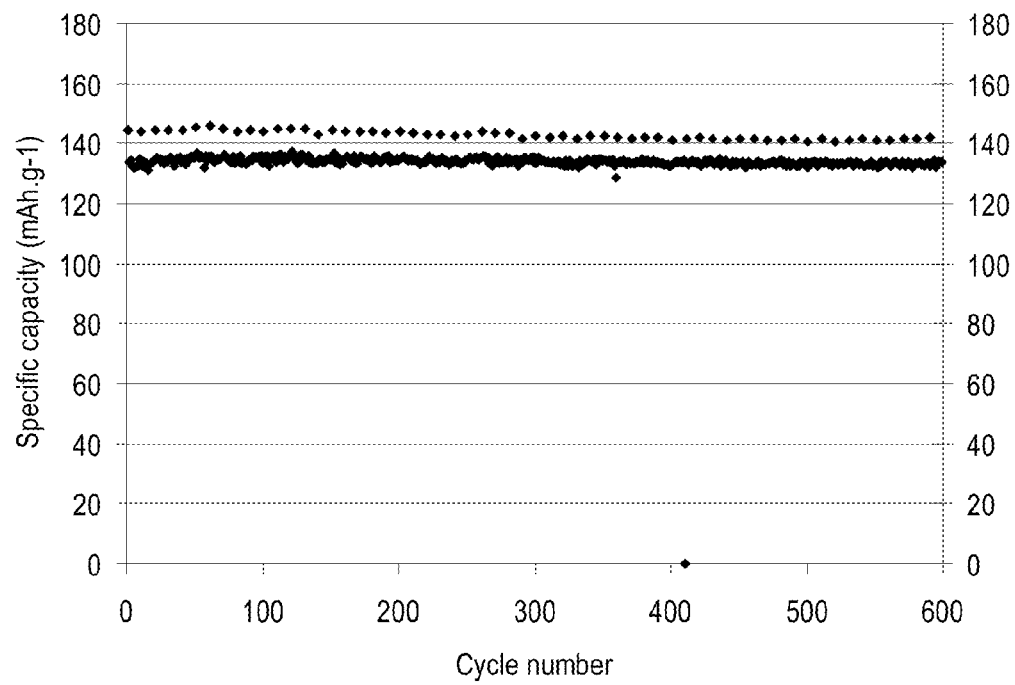

FIG. 6a shows the cycling stability at 21° C. (discharge rate 1 C and C/10 each 10th cycle, charged up to 4.25 V) of a lithium battery according to FIG. 5 with $LiMn_{0.8}Fe_{0.2}PO_4/C$ nanocomposite cathode (10% Ketjenblack EC600JD, Example 3).
Charging condition: CCCV 2.7-4.25V vs. Li
Discharge: C rate calculated from 150 mAh/g
Cathode: $LiMn_{0.8}Fe_{0.2}PO_4/C$+2% CNF+7.5% PVDF
Loading: 2.7 mg/cm$^2$
Electrolyte: LP30+1% VC.

Figure 6B:
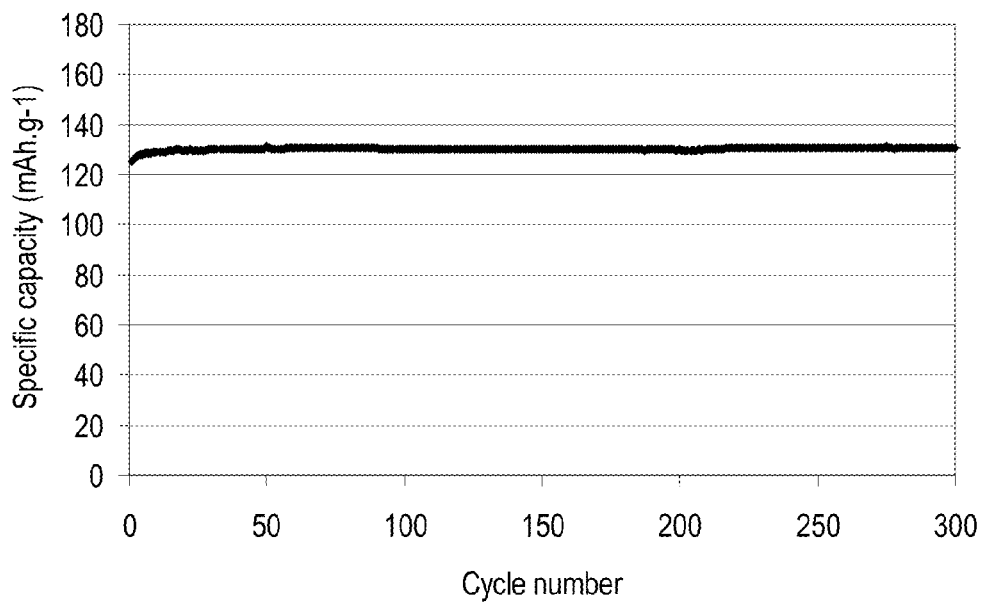

FIG. 6b shows the cycling stability at 50° C. (discharge rate 5 C, charged up to 4.25 V) of a lithium battery according to FIG. 5 with $LiMn_{0.8}Fe_{0.2}PO_4/C$ nanocomposite cathode (10% Ketjenblack EC600JD, Example 3).
Charging condition: CCCV 2.7-4.25V vs. Li
Discharge: C rate calculated from 150 mAh/g
Cathode: $LiMn_{0.8}Fe_{0.2}PO_4/C$+2% CNF+7.5% PVDF
Loading: 5.4 mg/cm$^2$
Electrolyte: LP30+1% VC.

Figure 7:
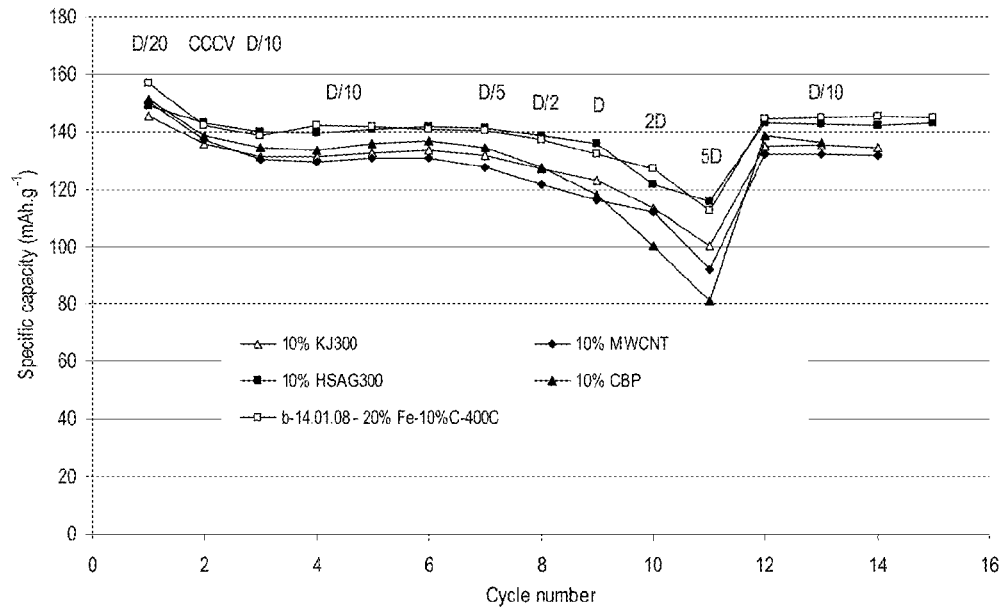

FIG. 7 shows the electrochemical performance of lithium batteries with $LiMn_{0.8}Fe_{0.2}PO_4/10\%$ C nanocomposite cathodes prepared from different carbon sources (Example 3) on cycling between 2.7 and 4.4 V against lithium:
Δ Ketjenblack EC-300J (Akzo Nobel, 800 m$^2$/g)
□ Ketjenblack EC-600JD (Akzo Nobel, 1400 m$^2$/g)
▲ Black Pearls 2000 (Cabot, 1500 m$^2$/g)
♦ Multi walled carbon nanotubes (MWCNT)
■ High surface graphite Timrex HSAG300 (Timcal, 280 m$^2$/g)
Ketjenblack EC-600JD and high surface graphite Timrex HSAG300 show the best performance with a capacity of 145 mAh/g at D10 and more than 110 mAh/g at 5 D.

Figure 8:
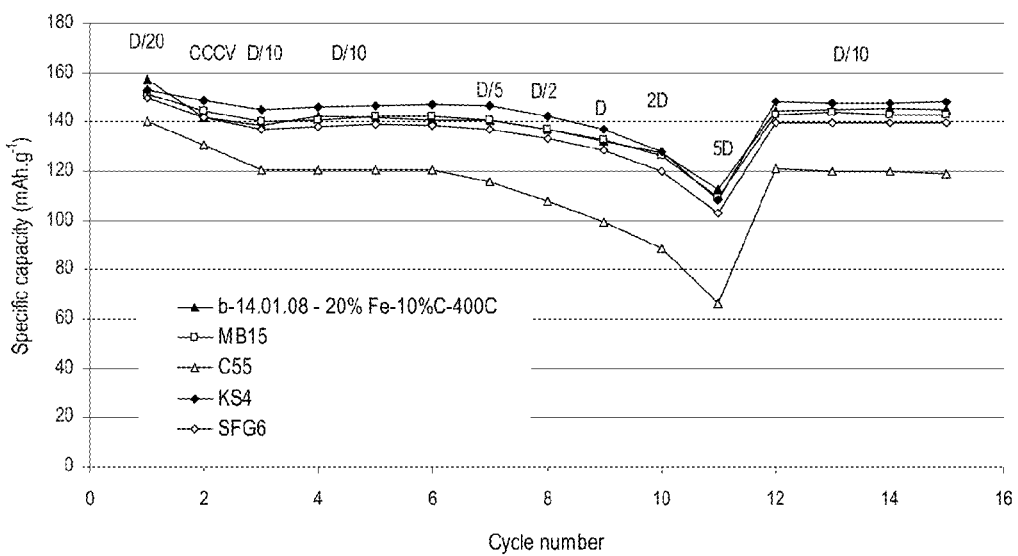

FIG. 8 shows the electrochemical performance of lithium batteries with $LiMn_{0.8}Fe_{0.2}PO_4/10\%$ C nanocomposite cathodes prepared from different carbon sources (Example 3) on cycling between 2.7 and 4.4 V against lithium:
▲ Ketjenblack EC-600JD (Akzo Nobel, 1400 m$^2$/g)
♦ Timrex KS4 graphite (Timcal, 26 m$^2$/g)
◊ Timrex SFG6 graphite (Timcal, 17 m$^2$/g)
□ Timrex MB 15 graphite (Timcal, 9.5 m$^2$/g)
Δ Shawinigan acetylene black C-55 (70 m$^2$/g)
The three different graphites yield comparable performance to Ketjenblack EC-600JD. Shawinigan acetylene black C-55 gives much lower capacity, especially at higher discharge rates.

Figure 9:
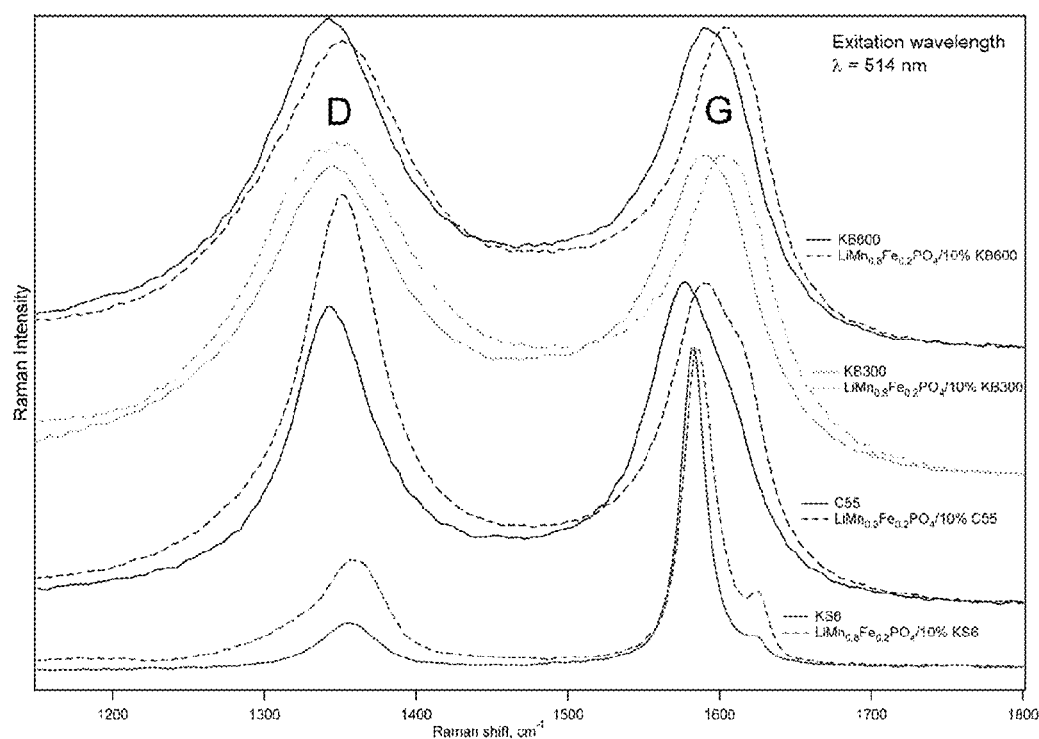

FIG. 9: Raman spectra of pure carbons and $LiMn_{0.8}Fe_{0.2}PO_4/10\%$ carbon nanocomposites (Example 3) in the region of the graphitic G band around 1600 cm$^{-1}$ and the disordered carbon D band around 1350 cm$^{-1}$.
The carbons are:
KB600: Ketjenblack EC600JD (Akzo Nobel, 1400 m$^2$/g)
KB300: Ketjenblack EC300J (Akzo Nobel, 800 m$^2$/g)
C55: Shawinigan acetylene black (70 m$^2$/g)
KS6: Timrex graphite (Timcal, 20 m$^2$/g).

Figure 10:
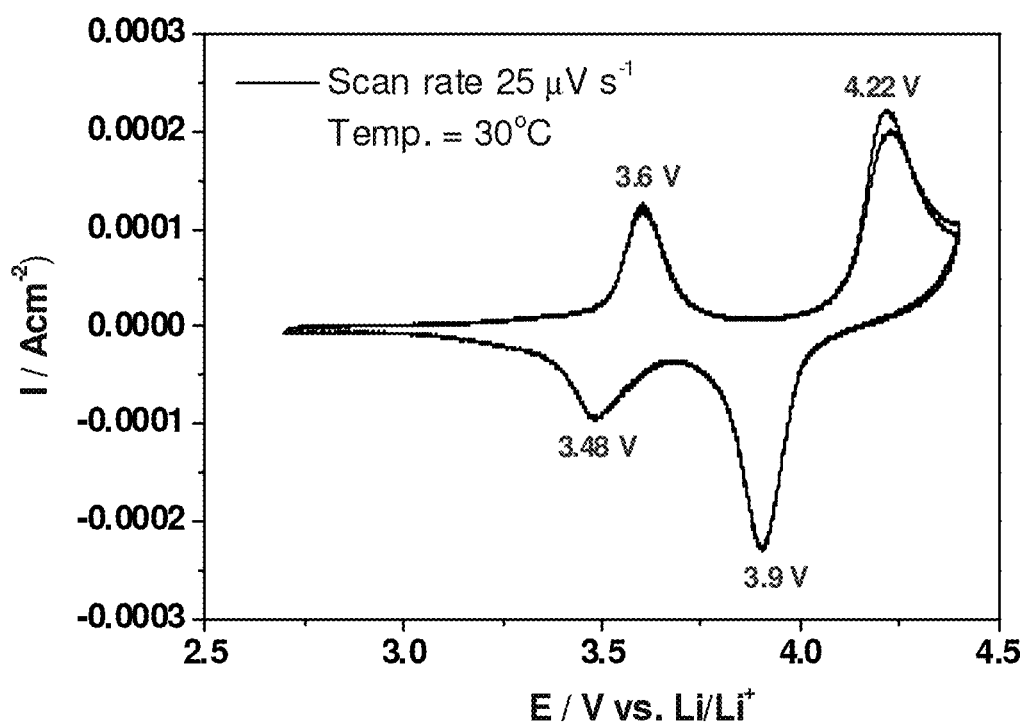

FIG. 10: Cyclic voltammogram of $LiMn_{0.8}Fe_{0.2}PO_4/C$ nanocomposite cathode (10% Ketjenblack EC600JD, Example 3)

Figure 11:
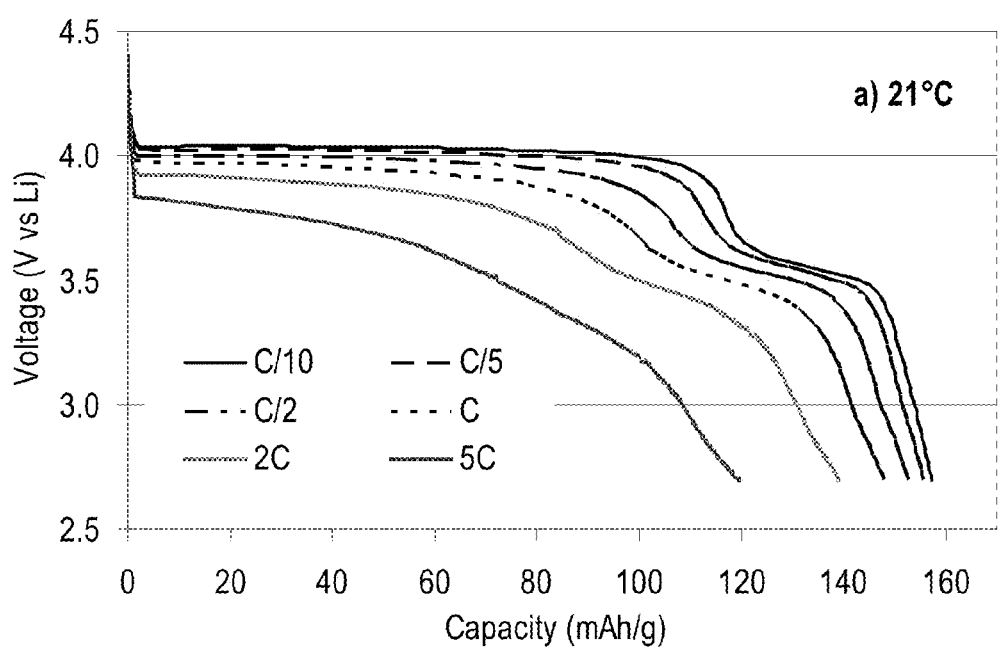

FIG. 11: Discharge curves of a lithium battery with $LiMn_{0.8}Fe_{0.2}PO_4/C$ nanocomposite cathode (10% Ketjenblack EC600JD, Example 3) at 21° C.
Charging condition: CCCV 2.7-4.4 V vs. Li
Discharge: C rate calculated from 150 mAh/g
Electrode: $LiMn_{0.8}Fe_{0.2}PO_4/C$+2% CNF+7.5% PVDF
Loading: 4.6 mg/cm$^2$
Electrolyte: 1M LiPF$_6$/EC/DMC 1:1+2% VC.

Figure 12:
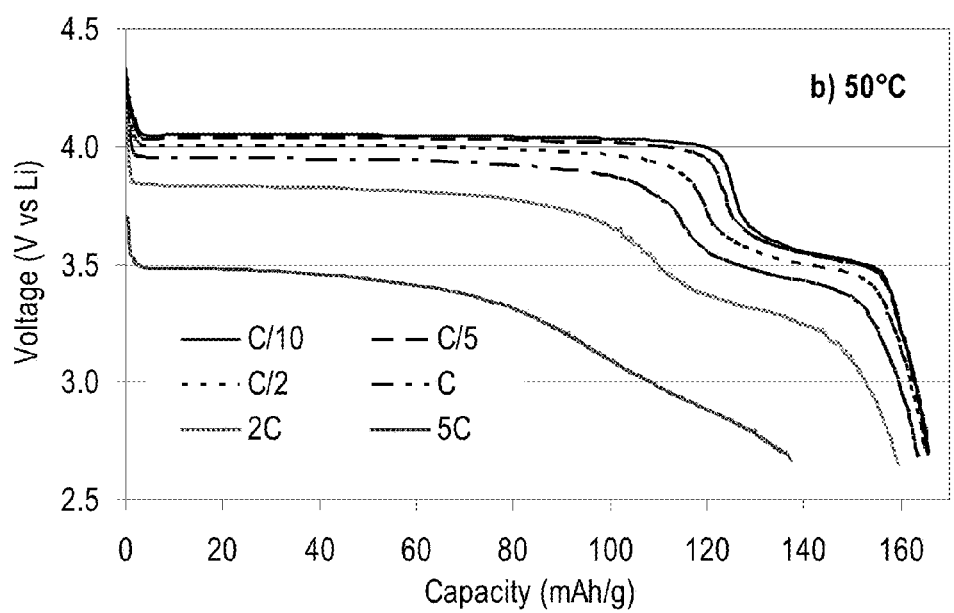

FIG. 12: Discharge curves of a lithium battery with $LiMn_{0.8}Fe_{0.2}PO_4/C$ nanocomposite cathode (10% Ketjenblack EC600JD, Example 3) at 50° C.
Charging condition: CCCV 2.7-4.4 V vs. Li
Discharge: C rate calculated from 150 mAh/g
Electrode: $LiMn_{0.8}Fe_{0.2}PO_4/C$+2% CNF+7.5% PVDF
Loading: 4.4 mg/cm$^2$
Electrolyte: 1M LiPF$_6$/EC/DMC 1:1+1% VC.

Figure 13:
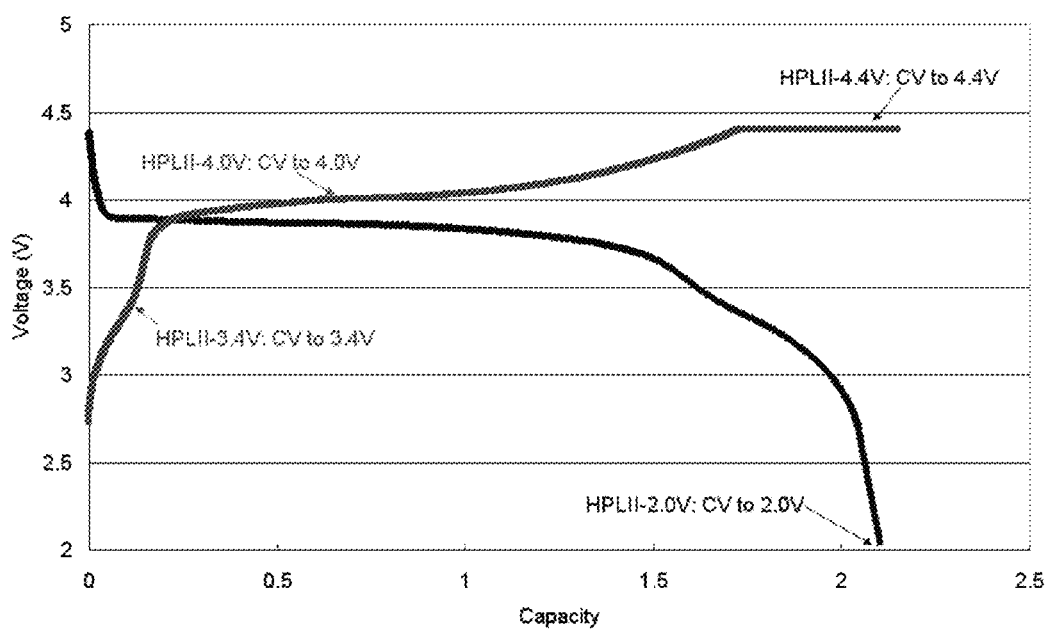

FIG. 13: Cell charge status for XRD analysis
Electrode from coin cell
0.1 C for 2~3 cycles
2.0V: 0.01 C discharge and CV to 2.0V→$Li_{\sim 1}Mn_{0.8}Fe_{0.2}PO_4$
3.4V: 0.1 C charge and CV to 3.4V→$Li_{\sim 0.95}Mn_{0.8}Fe_{0.2}PO_4$
4.0V: 0.1 C charge and CV to 4.0V→$Li_{\sim 0.7}Mn_{0.8}Fe_{0.2}PO_4$
4.4V: 0.1 C charge and CV to 4.4V→$Li_{\sim 0}Mn_{0.8}Fe_{0.2}PO_4$
After CV, dismount the coin cell and clean with EMC then dry in vacuum oven with 60° C.

Figure 14:
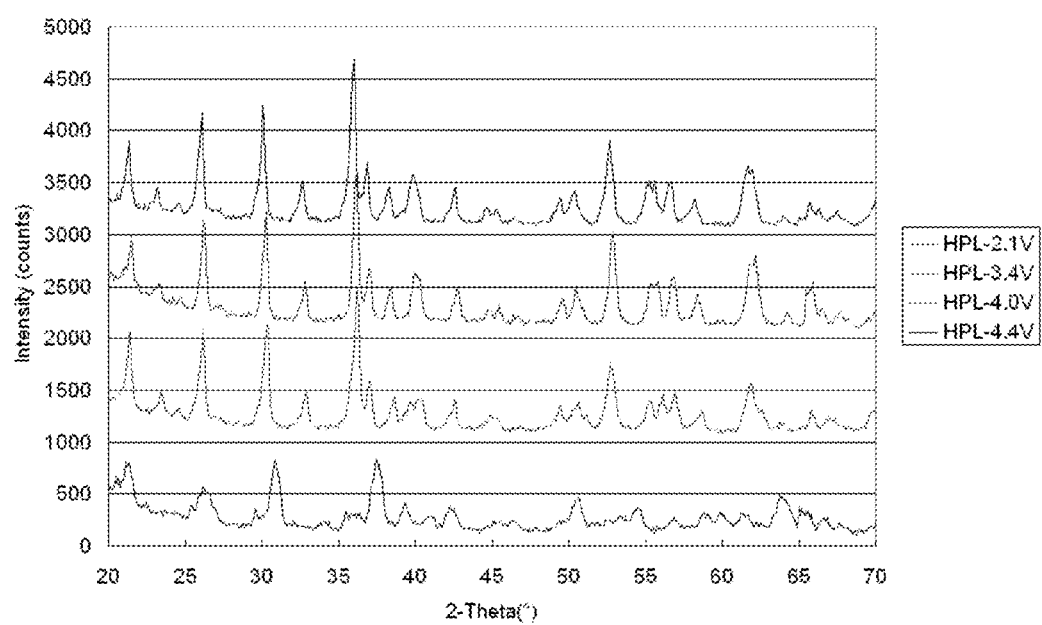

FIG. 14: XRD patterns of the cathode at different states of charge
2.0V→$Li_{\sim 1}Mn_{0.8}Fe_{0.2}PO_4$
3.4V→$Li_{\sim 0.95}Mn_{0.8}Fe_{0.2}PO_4$
4.0V→$Li_{\sim 0.7}Mn_{0.8}Fe_{0.2}PO_4$, still single olivine phase with reduced lattice parameters
4.4V→$Li_{\sim 0}Mn_{0.8}Fe_{0.2}PO_4$, new phase.

Figure 15:
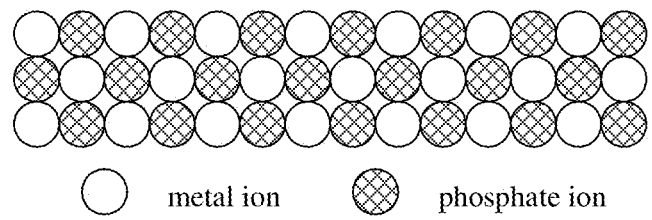
Figure 15:
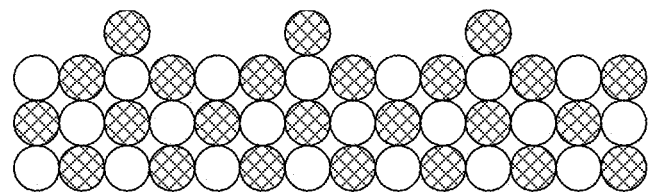
Figure 15:
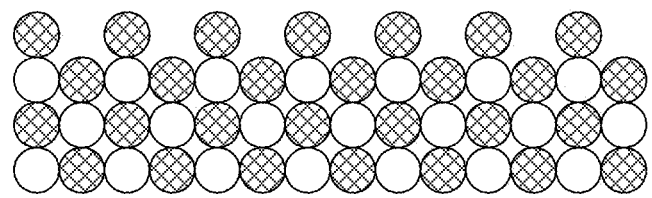
Figure 15:
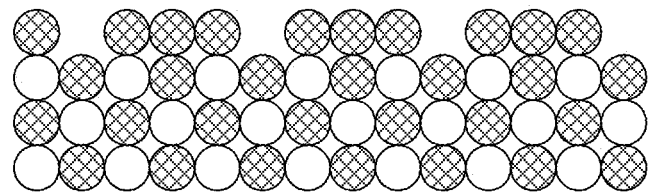

FIG. 15: Schematic side view of the lithium metal phosphate particle surface with different terminations (the charge compensating lithium ions are omitted for clarity).

Figure 16:
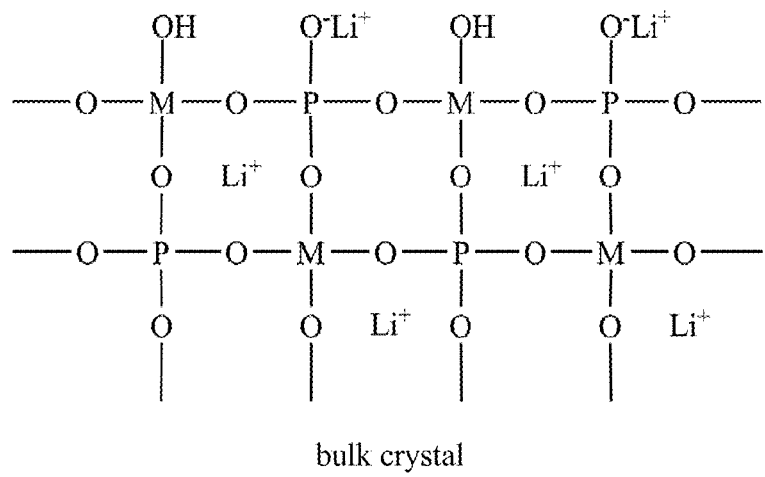
Figure 16:
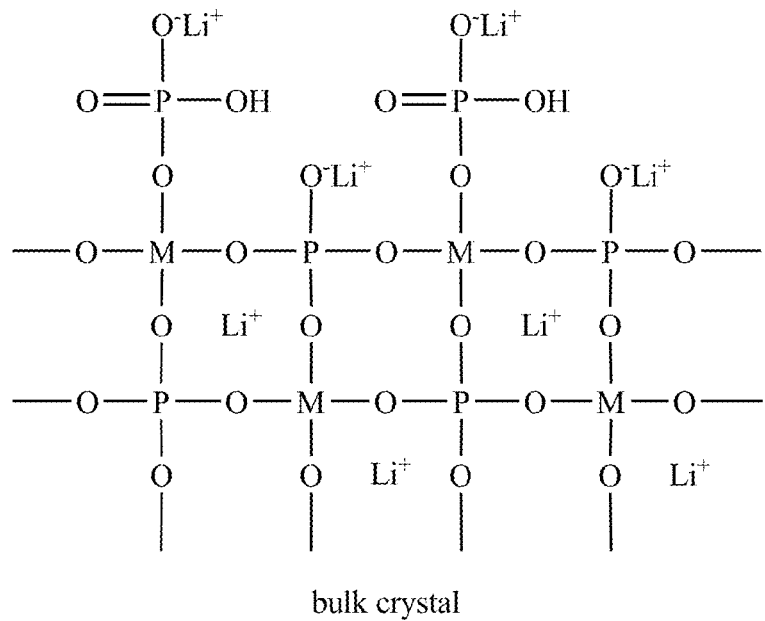

FIG. 16: Simplified two-dimensional representation of the lithium metal phosphate lattice with a) stoichiometric surface and b) the same surface with phosphate termination (in the real three-dimensional lattice the metal ions M have octahedral coordination).

Figure 17:
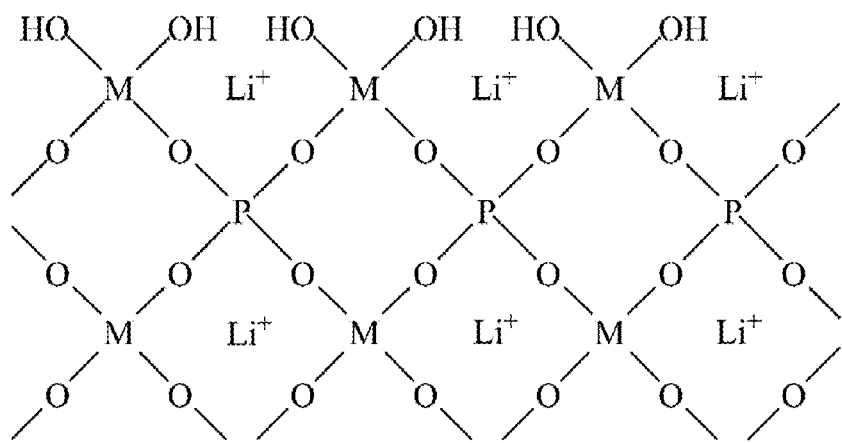
Figure 17:
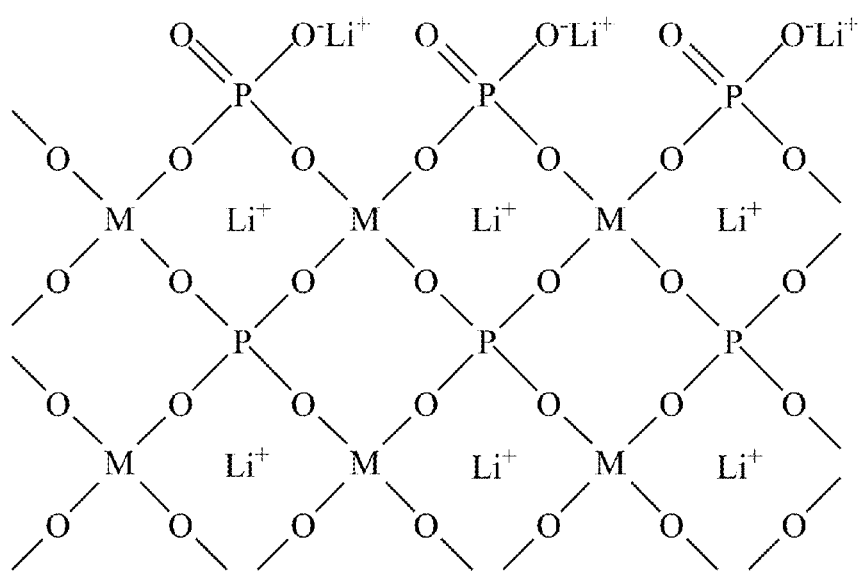

FIG. 17: Simplified two-dimensional representation of the lithium metal phosphate lattice with a) metal hydroxide terminated surface and b) the same surface with phosphate termination (in the real three-dimensional lattice the metal ions M have octahedral coordination).

Figure 18:
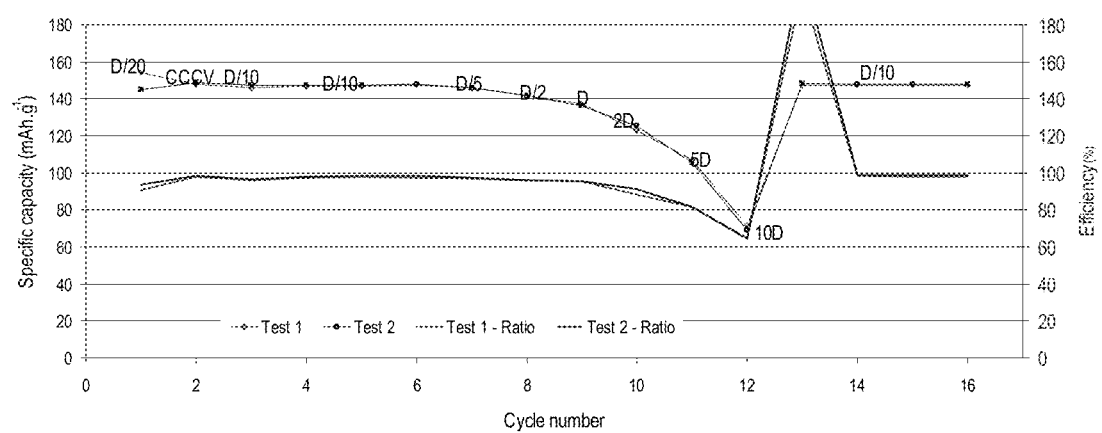

FIG. 18 shows the electrochemical performance of a lithium battery with $Li_{1.04}Mn_{0.8}Fe_{0.2}(PO_4)_{1.04}/10\%$ C nanocomposite containing 4% excess lithium phosphate (Example 7).

Figure 19:
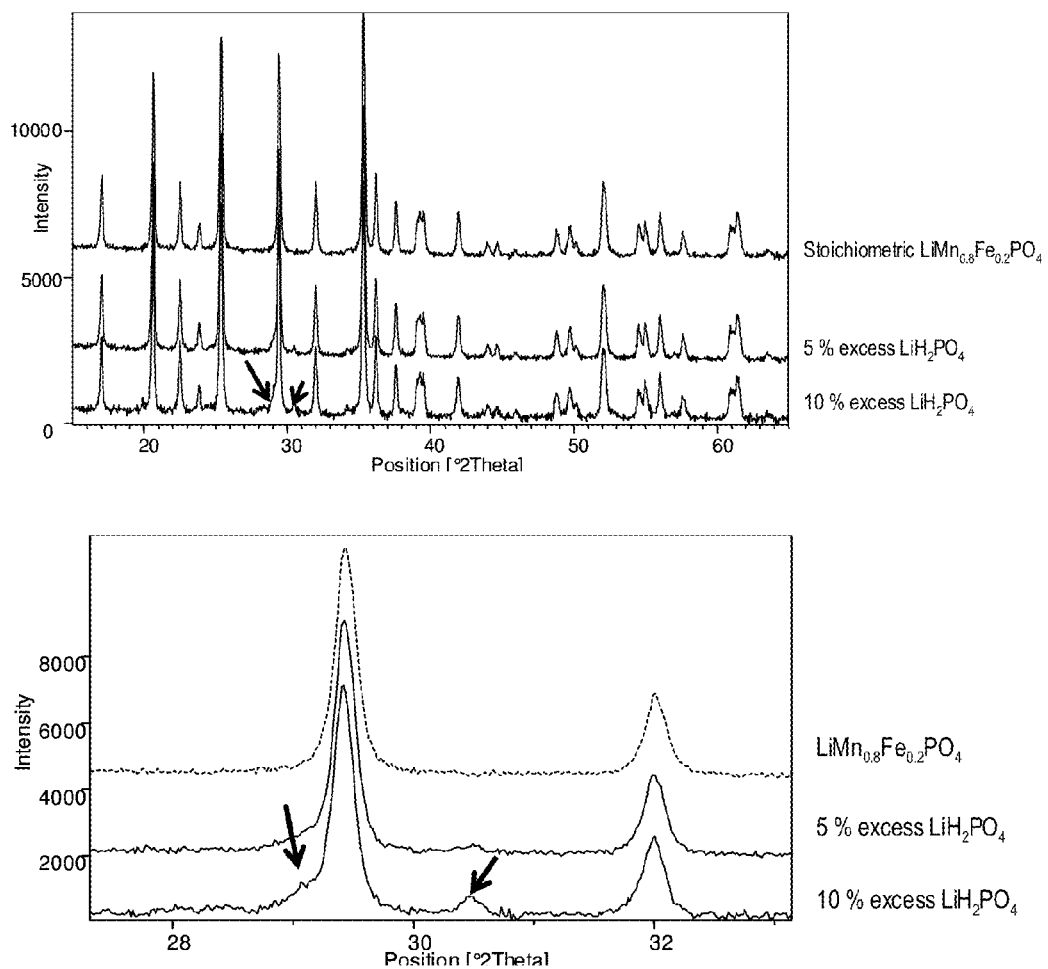

FIG. 19 shows the XRD patterns of $LiMn_{0.8}Fe_{0.2}PO_4/C$ nanocomposites (10% Ketjenblack EC600JD) with stoichiometric composition and 5%, respectively 10% excess $LiH_2PO_4$.

Figure 20:
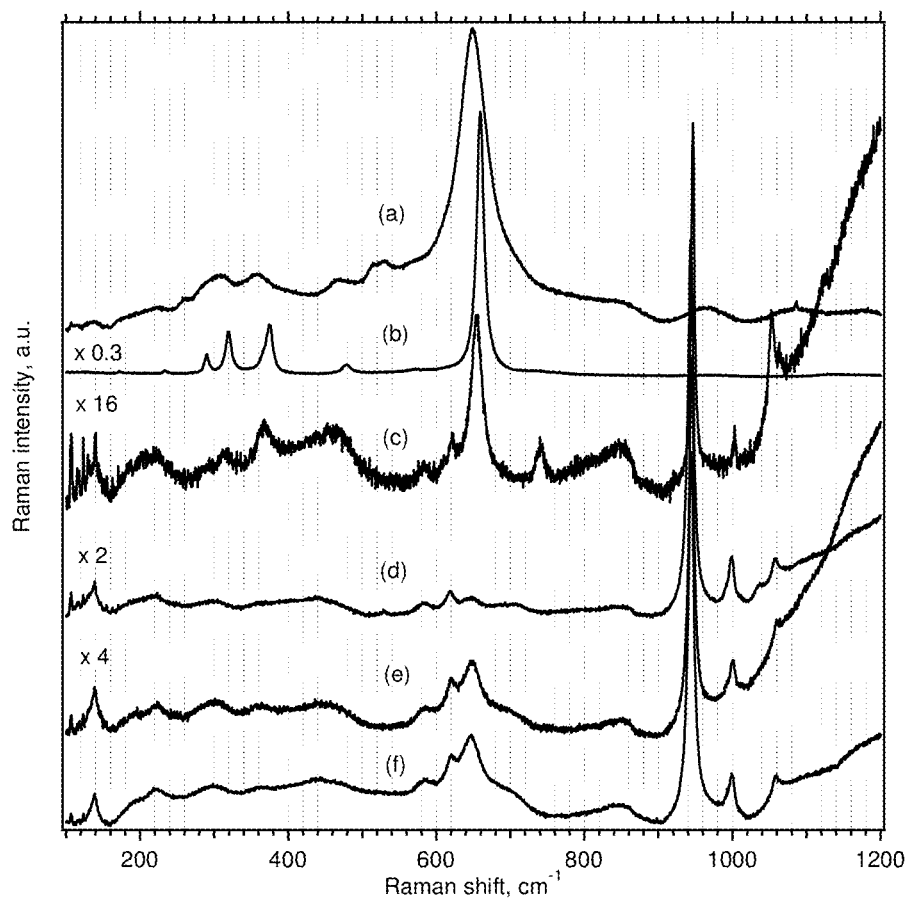

FIG. 20 show the Raman spectra of pure $LiMnPO_4$+carbon prepared as described in example 9, in one case with 20% of Mn-oxalate (curve e and f), in the other case without Mn-oxalate (curve c and d), together with $MnO_2$ (curve a) and hausmannite $Mn_3O_4$ from Aldrich (curve b). Spectrum (c) is LMP without Mn-oxalate, sample F101_B_5. Spectrum (d) is LMP without Mn-oxalate, sample F101_B_6. Spectrum (e) is LMP with Mn-oxalate, sample F101_A_4. Spectrum (0 is LMP with Mn-oxalate, sample F101_A_5. In each case, two laser powers are used (D0.6 means higher laser power). Excitation wavelength 633 nm. The spectra are offset for clarity. The spectra are normalized to the intensity of the $_1(PO_4)$ band (in the case of LMP samples).

Both the measured manganese oxides (curve a and b) are characterized by an intense band at around 640-650 cm-1, and a few less intense bands between 300 and 500 cm-1. In the case of $MnO_2$, all the bands are very broad and downshifted. Moreover, some other bands are present, e.g. at 520 cm-1. The explanation for the similarity is based upon the highest stability against the laser of hausmannite amongst manganese oxides. Therefore, some of other manganese oxides tend to verge into $Mn_3O_4$ during the Raman observation. In all LMP spectra, the band at ca 645 cm-1 is present. It has the highest relative intensity in LMP without Mn-oxalate taken at lower laser power. On the other hand, the same sample measured at a higher laser power shows relatively weak signal of $Mn_3O_4$. The sample prepared with 20% of Mn-oxalate shows very similar spectra under both laser powers. The parameters of the possible Mn—O bands in the sample without Mn-oxalate at lower laser power (spectrum d in FIG. 20) are very close to those of hausmannite in terms of position and FWHM. In the other LMP spectra, these bands are more downshifted and broadened, towards "MnO2" spectrum.

The close resemblance of its peak pattern to hausmannite is evident, albeit not unambiguous. Lower symmetry and/or presence only in a thin layer on the LMP-carbon interface can be also responsible for some peak broadening and downshifting compared to hausmannite. The sharpness of the Mn—O bands in LMP without Mn-oxalate even at lower laser power indicates that this manganese oxide has not been generated by the laser-induced heating.

A partial presence of another Mn-oxide, e.g. bixbyite, (Mn, Fe)2O3, cannot be ruled out. The loss of Mn—O signal with increasing laser power in this sample (without Mn-oxalate) is intriguing, as well as almost the same signal in the other sample (with Mn-oxalate) at both laser powers.

Figure 21:
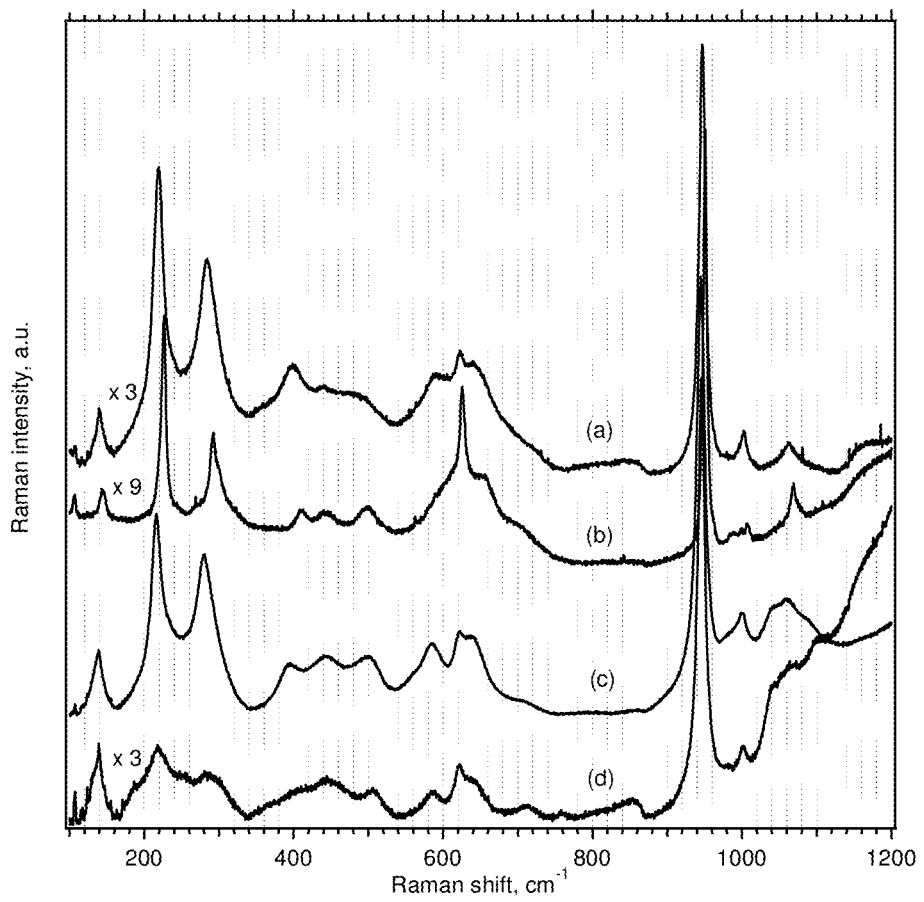

FIG. 21 shows the spectra (Labram HR, Horiba Jobin-Yvon, λ 633 nm) of LMP/LFP/carbon mixtures prepared as described in Example 2 and Example 7, comparing two Calcination conditions which may lead to different amounts of oxidation interface. Calcination in pure argon (curve A sample HPLLMP66) vs. argon/hydrogen (curve B, sample HPLLMP67). However, it was not possible to measure the two samples under the same laser power. HPLLMP66 (under Ar—Curve A) gave no signal besides carbon at D2, while HPLLMP67 (under Ar/H2—curve B showed optical changes (i.e. burning) during irradiation at D1. Though one accumulation spectrum at D1 was roughly similar to that at D2, a longer exposition to acquire a better quality spectrum was not possible. Such a varying reaction to the laser already points to a different nature of the Ar and Ar/H2 calcined materials and their interfaces.

The observed broadening of the bands in HPLLMP66 curve A is caused by the higher laser power. A slightly higher Fe2O3 signal in this sample and significantly more intense v4(PO4) band at 625 cm-1 in curve B, HPLLMP67 (Ar/H2) point to a more reduced state of sample calcined under Ar/H2 and a more oxidized state of the sample calcined only under argon, which was anticipated. This is indicative of a modified interface. The curve c and d in FIG. 21 show LMP/LFP/carbon mixtures prepared with 5 and 10% excess of LiH2PO4, respectively (same laser power) they are prepared as in Example 7. In this samples is the Fe2O3 and Mn3O4 signals less intensive but still obvious. The v1(PO4) band is also narrower by 1.5 cm-1 for 10% LiH2PO4 excess sample. The change in spectra versus curve b example 3 is illustrative of a different interface.

Figure 22:
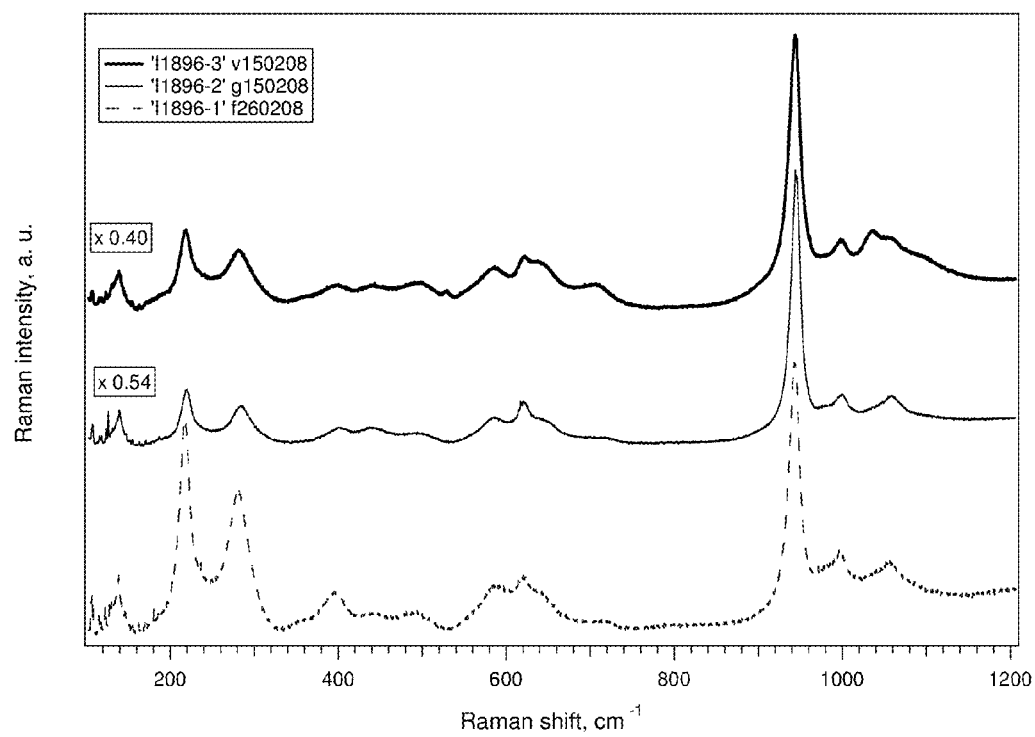

FIG. 22 shows Raman spectra of $LiMn_yFe_{1-y}PO_4/C$ cathode material prepared in example 3 with Ketjenblack® EC600JD (Akzo Nobel) $LiMn_yFe_{1-y}PO_4/C$, Vulcan XC72R and Acetylene black C55 measured using LabRam HR, Horiba JY. The laser excitation wavelength was 633 nm and spectra are normalized to the $v_1$ $PO_4$ vibration at 945 $cm^{-1}$.

Figure 23:
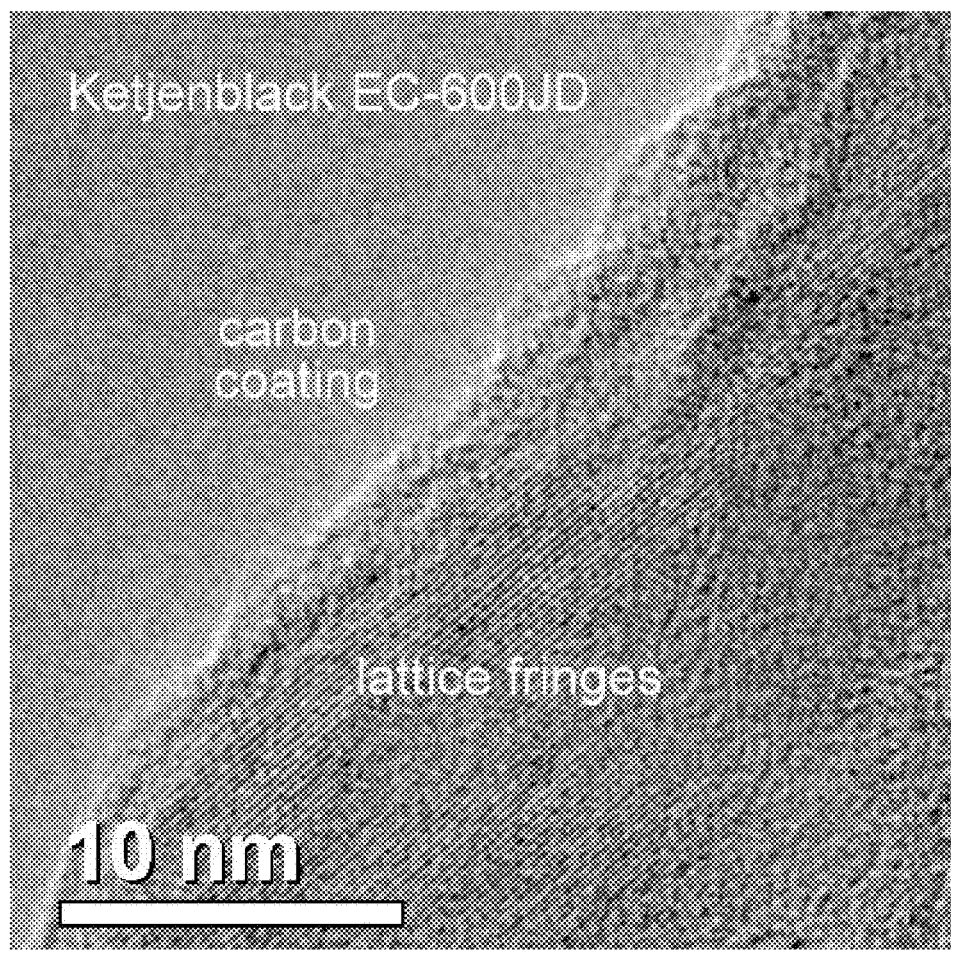

FIG. 23: HRTEM picture of $LiMn_{0.8}Fe_{0.2}PO_4/C$ nanocomposite with 10% Ketjenblack® EC-600JD (Akzo Nobel, 1400 $m^2$/g) (Example 3) showing intimate large-area contact between carbon and nanocrystalline active material (lattice fringes).

Figure 24:
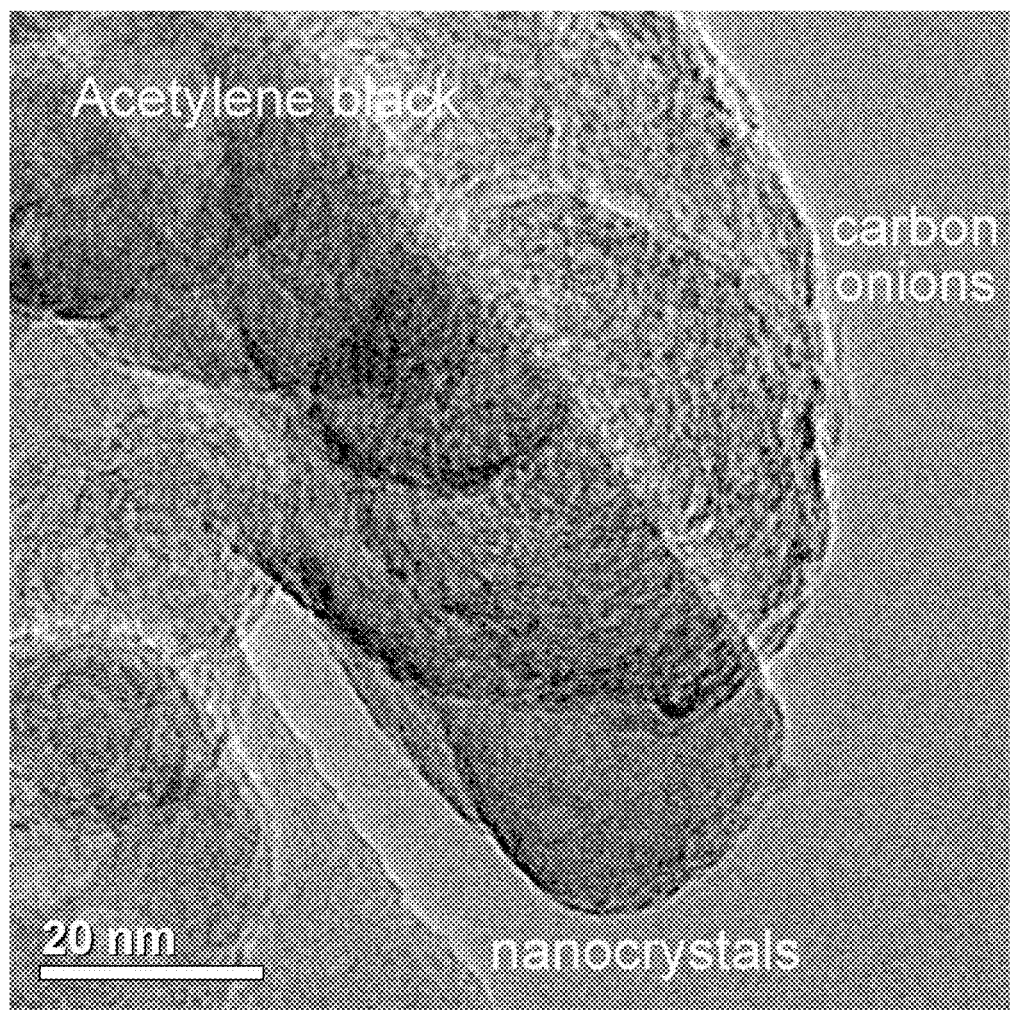

FIG. 24: HRTEM picture of $LiMn_{0.8}Fe_{0.2}PO_4/C$ nanocomposite with 10% Shawinigan acetylene black C-55 (70 $m^2$/g) (Example 3) showing intact carbon black onions making only point contacts with prismatic nanocrystals of active material.

Figure 25:
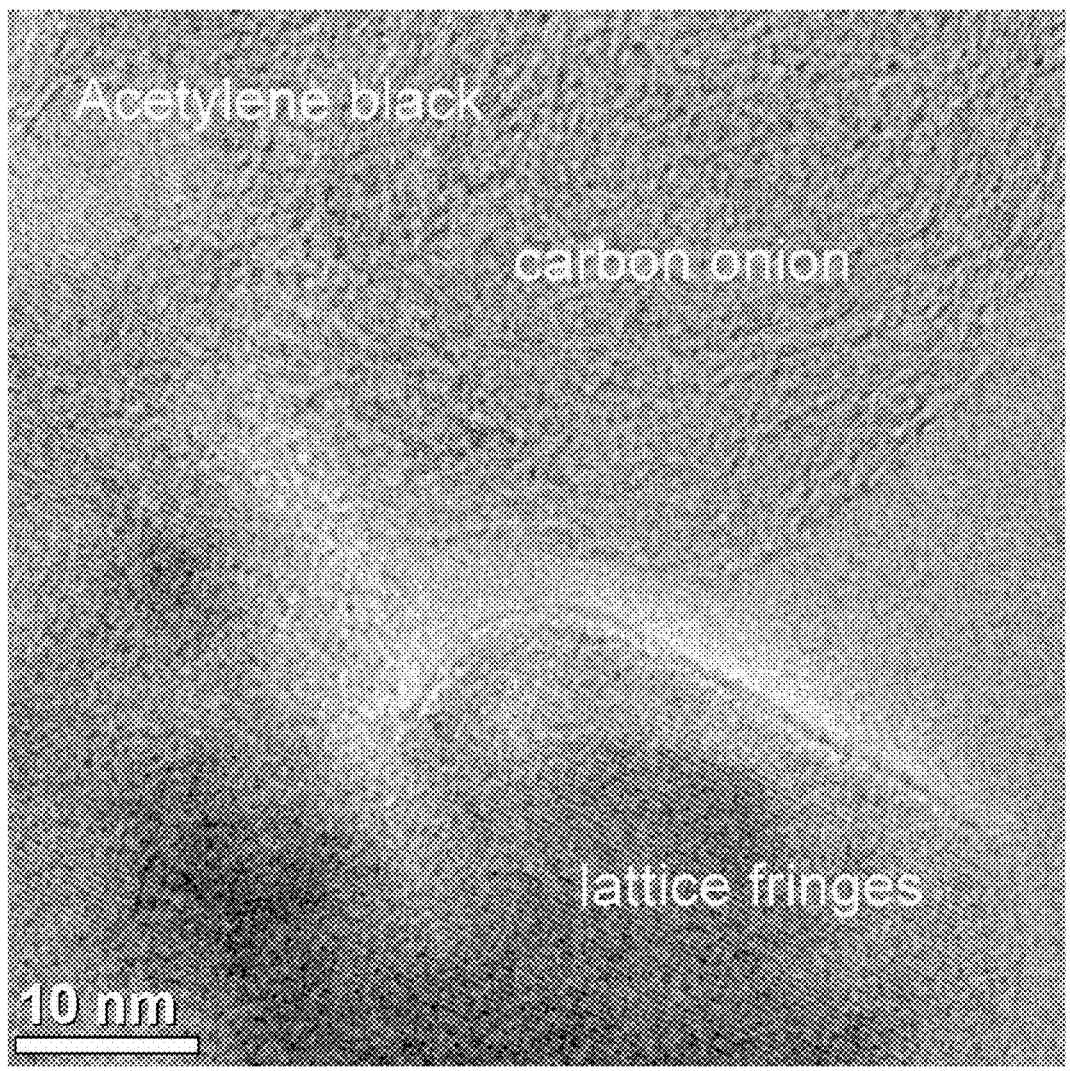

FIG. 25: HRTEM picture of $LiMn_{0.8}Fe_{0.2}PO_4/C$ nanocomposite with 10% Shawinigan acetylene black C-55 (70 $m^2$/g) (Example 3) showing a carbon onion and a nanocrystal of active material (lattice fringes) without carbon coating.

Figure 26:
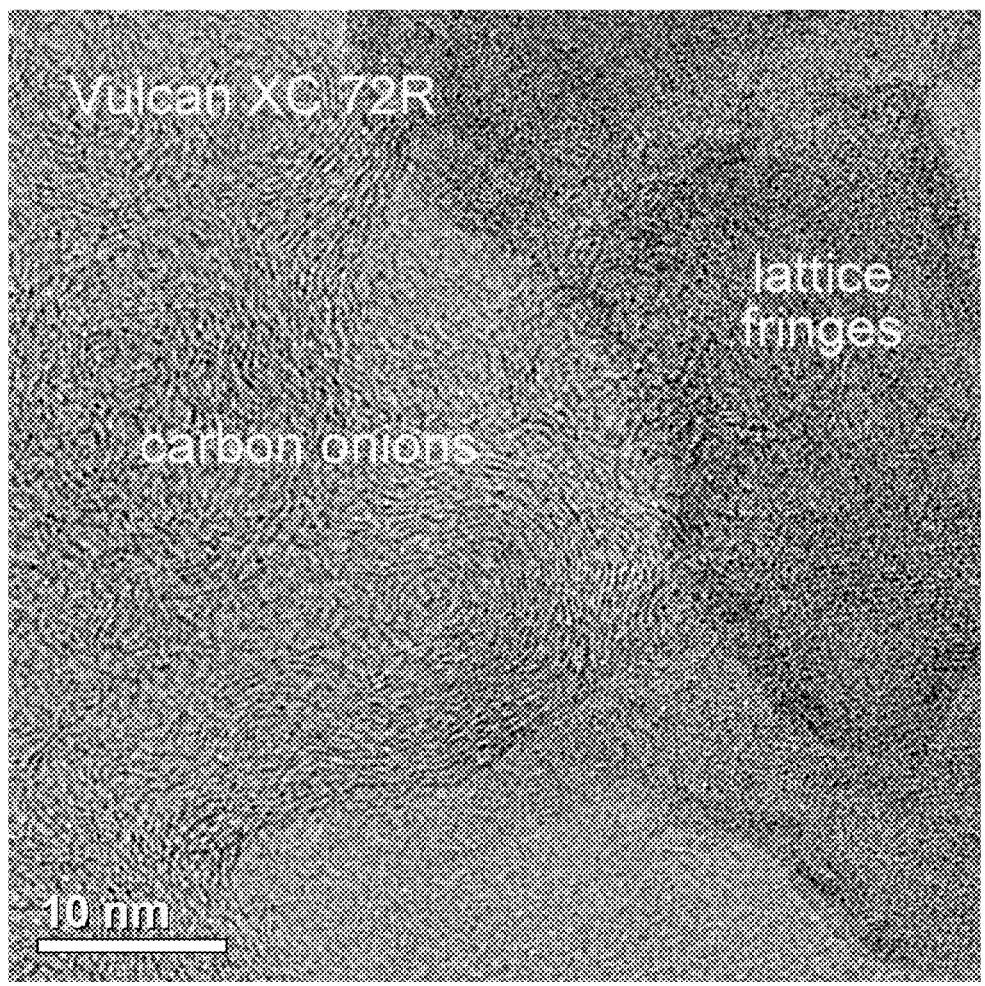

FIG. 26: HRTEM picture of $LiMn_{0.8}Fe_{0.2}PO_4/C$ nanocomposite with 10% Vulcan XC 72R (270 $m^2$/g) (Example 3) showing intact carbon onions.

REFERENCES

1. Howard, W. F.; Spotnitz, R. M., Theoretical evaluation of high-energy lithium metal phosphate cathode materials in Li-ion batteries. *Journal of Power Sources* 2007, 165, (2), 887-891. http://dx.doi.org/10.1016/j.jpowsour.2006.12.046
2. Padhi, A. K.; Nanjundaswamy, K. S.; Goodenough, J. B., Phospho-olivines as positive-electrode materials for rechargeable lithium batteries. *Journal of the Electrochemical Society* 1997, 144, (4), 1188-1194. http://dx.doi.org/10.1149/1.1837571
3. Goodenough, J. B., Cathode materials for secondary (rechargeable) lithium batteries. U.S. Pat. No. 5,910,382 1999. http://www.google.com/patents?id=RYEZAAAAEBAT&dq=goodenough
4. Goodenough, J. B., Cathode materials for secondary (rechargeable) lithium batteries. U.S. Pat. No. 6,514,640 2003. http://www.google.com/patents?id=-L4NAAAAEBAJ&dq=goodenough
5. Yamada, A.; Li, G.; Azuma, H., Positive electrode active material, non-aqueous electrolyte secondary battery. U.S. Pat. No. 7,217,474 2007. http://www.google.com/patents?id=BPh AA.AAEB.A.1&dq=7217474
6. Yamada, A.; Li, G.; Azuma, H., Positive electrode active material, non-aqueous electrolyte secondary battery. U.S. Pat. No. 7,147,969 2006. http://www.google.com/patents?id=oJd9AAAAEBAJ&dq=7147969
7. Okawa, T.; Hosoya, M.; Kuyama, J.; Fukushima, Y., Non-aqueous electrolyte secondary cell with a lithium metal phosphate cathode. U.S. Pat. No. 7,122,272 2006. http://www.google.com/patents?id=dhh7AAAAEBAJ&dq=7122272
8. Li, G., Positive electrode material and battery using the same. U.S. Pat. No. 7,029,795 2006. http://www.google.com/patents?id=AoN3AAAAEBAJ&dq=7029795
9. Li, G., Positive electrode active material and non-aqueous electrolyte cell. U.S. Pat. No. 6,749,967 2004. http://www.google.com/patents?id=8fAPAAAAEBAJ&dq=6749967 http://www.freepatentsonline.com/6749967.html
10. Yamada, A.; Li, G.; Azuma, H., Positive electrode active material, non-aqueous electrolyte secondary battery. U.S.

Pat. No. 6,632,566 2003. http://www.google.com/patents?id=t58NAAAAEBAJ&dq=Guohua+Li
11. Li, G. H.; Azuma, H.; Tohda, M., LiMnPO4 as the cathode for lithium batteries. *Electrochemical and Solid State Letters* 2002, 5, (6), A135-A137. http://dx.doi.org/10.1149/1.1475195
12. Yamada, A.; Chung, S. C., Crystal chemistry of the olivine-type Li(MnyFe1-y)PO4 and (MnyFe1-y)PO4 as possible 4V cathode materials for lithium batteries. *Journal of the Electrochemical Society* 2001, 148, (8), A960-A967. http://dx.doi.org/10.1149/1.1385377
13. Yamada, A.; Hosoya, M.; Chung, S. C.; Kudo, Y.; Hinokuma, K.; Liu, K. Y.; Nishi, Y., Olivine-type cathodes achievements and problems. *Journal of Power Sources* 2003, 119, 232-238. http://dx.doi.org/10.1016/S0378-7753(03)00239-8
14. Li, G.; Yamada, A.; Azuma, H., Method for manufacturing active material of positive plate and method for manufacturing nonaqueous electrolyte secondary cell. EP1094532 2001.
15. Li, G.; Yamada, A., Positive electrode active material and non-aqueous electrolyte cell. Patent 2001, US 20010055718. http://www.freepatentsonline.com/20010055718.html
16. Li, G. H.; Azuma, H.; Tohda, M., Optimized LiMnyFe1-yPO4 as the cathode for lithium batteries. *Journal of the Electrochemical Society* 2002, 149, (6), A743-A747. http://dx.doi.org/10.1149/1.1473776
17. Delacourt, C.; Laffont, L.; Bouchet, R.; Wurm, C.; Leriche, J. B.; Morcrette, M.; Tarascon, J. M.; Masquelier, C., Toward understanding of electrical limitations (electronic, ionic) in LiMPO4 (M=Fe, Mn) electrode materials. *Journal of the Electrochemical Society* 2005, 152, A913-A921. http://dx.doi.org/10.1149/1.1884787
18. Molenda, J.; Ojczyk, W.; Marzec, J., Electrical conductivity and reaction with lithium of LiFe1-yMnyPO4 olivine-type cathode materials. *Journal of Power Sources* 2007, 174, (2), 689-694. http://dx.doi.org/10.1016j.jpowsour.2007.06.238
19. Delacourt, C.; Poizot, P.; Morcrette, M.; Tarascon, J. M.; Masquelier, C., One-step low-temperature route for the preparation of electrochemically active LiMnPO4 powders. *Chemistry of Materials* 2004, 16, (1), 93-99. http://dx.doi.org/10.1021/cm030347b
20. Delacourt, C.; Wurm, C.; Reale, P.; Morcrette, M.; Masquelier, C., Low temperature preparation of optimized phosphates for Li-battery applications. *Solid State Ionics* 2004, 173, (1-4), 113-118. http://dx.doi.org/10.1016/j.ssi.2004.07.061
21. Fang, H. S.; Li, L. P.; Li, G. S., Hydrothermal synthesis of electrochemically active LiMnPO4. *Chemistry Letters* 2007, 36, 436-437. <Go to ISI>://WOS:000246058000043
22. Mi, C. H.; Zhang, X. G.; Zhao, X. B.; Li, H. L., Synthesis and performance of LiMn0.6Fe0.4PO4/nano-carbon webs composite cathode. *Materials Science and Engineering B-Solid State Materials for Advanced Technology* 2006, 129, (1-3), 8-13. http://dx.doi.org/10.016/j.mseb.2005.11.015
23. Drezen, T.; Kwon, N.-H.; Bowen, P.; Teerlinck, I.; Isono, M.; Exnar, I., Effect of particle size on LiMnPO4 cathodes. *Journal of Power Sources* 2007, 174, (2), 949-953. http://dx.doi.org./10.1016/j.jpowsour.2007.06.203
24. Kwon, N. H.; Drezen, T.; Exnar, I.; Teerlinck, I.; Isono, M.; Graetzel, M., Enhanced electrochemical performance of mesoparticulate LiMnPO4 for lithium ion batteries. *Electrochemical and Solid State Letters* 2006, 9, (6), A277-A280. http://dx.doi.org/10.1149/1/2191432
25. Kwon Roth, N. H., Mesoscopic manganese based cathode materials for high voltage lithium ion batteries. *Ph.D. Thesis, ÉCOLE POLYTECHNIQUE FÉDÉRALE DE LAUSANNE* 2006. http://library.epfl.ch/theses/?nr=3502
26. Exnar, I.; Drezen, T., Synthesis of nanoparticles of lithium metal phosphate positive material for lithium secondary battery. PCT/IB2006/051061 2006. http://www.wipo.int/pctdb/en/wo.jsp?wo=2007113624
27. Exnar, I.; Drezen, T.; Frank; Zukalova; Miners, J.; Kavan, L., Carbon Coated Lithium Manganese Phosphate Cathode Material. EPA No. 07112490.3.
28. Yamada, A.; Kudo, Y.; Liu, K. Y., Reaction mechanism of the olivine-type Li-x(Mn0.6Fe0.4)PO4 (0<=x<=1). *Journal of the Electrochemical Society* 2001, 148, (7), A747-A754. http://link.aip.org/link/?JES/148/A747/1
29. Yamada, A.; Chung, S. C., Crystal chemistry of the olivine-type LiMn$_y$Fe$_{1-y}$PO$_4$ and Mn$_y$Fe$_{1-y}$PO$_4$ as possible 4V cathode materials for lithium batteries. *Journal of the Electrochemical Society* 2001, 148, (8), A960-A967. http://dx.doi.org/10.1149/1.1385377
30. Yamada, A.; Kudo, Y.; Liu, K. Y., Phase diagram of Li-x(MnyFe1-y)PO4 (0<=x, y<=1). *Journal of the Electrochemical Society* 2001, 148, (10), A1153-A1158.
31. Yamada, A.; Masao, Y.; Yuki, T.; Noriyuki, S.; Ryoji, K., Fast Charging LiFePO4. *Electrochemical and Solid-State Letters* 2005, 8, (1), A55-A58. http://dx.doi.org/10.1149/1.1836117
32. Yamada, A.; Takei, Y.; Koizumi, H.; Sonoyama, N.; Kanno, R.; Itoh, K.; Yonemura, M.; Kamiyama, T., Electrochemical, magnetic, and structural investigation of the Li-x(MnyFe1-y)PO4 olivine phases. *Chemistry of Materials* 2006, 18, (3), 804-813
33. Meethong, N.; Huang, H. Y. S.; Speakman, S. A.; Carter, W. C.; Chiang, Y. M., Strain accommodation during phase transformations in olivine-based cathodes as a materials selection criterion for high-power rechargeable batteries. *Advanced Functional Materials* 2007, 17, 1115-1123.
34. Kopec, M.; Yamada, A.; Kobayashi, G.; Nishimura, S.; Kanno, R.; Mauger, A.; Gendron, F.; Julien, C. M., Structural and magnetic properties of Lix(MnyFe1-y)PO4 electrode materials for Li-ion batteries. *Journal of Power Sources* 2009, In Press, Corrected Proof. http://dx.doi.org/10.1016/j.jpowsour.2008.12.096
35. Wang, L.; Zhou, F.; Ceder, G., Ab Initio Study of the Surface Properties and Nanoscale Effects of LiMnPO[sub 4]. *Electrochemical and Solid-State Letters* 2008, 11, (6), A94-A96. http://link.aip.org/link/?ESL/11/A94/1
36. Boldyrev, V. V., Mechanochemistry and mechanical activation of solids. *Russian Chemical Reviews* 2006, 75, (3), 177-189. http://dx.doi.org/10.1070/RC2006v075n03ABEH001205
37. Suryanarayana, C., *Mechanical Alloying and Milling*. Marcel Dekker: New York, 2004.
38. Tarascon, J. M.; Morcrette, M.; Saint, J.; Aymard, L.; Janot, R., On the benefits of ball milling within the field of rechargeable Li-based batteries. *Comptes Rendus Chimie* 2005, 8, (1), 17-26. http://dx.doi.org/10.1016/j.crci.2004.12.006
39. Hosoya, M.; Takahashi, K.; Fukushima, Y., Cathode active material, method for preparation thereof, non-aqueous electrolyte cell and method for preparation thereof. EP1184920 2002. http://www.freepatentsonline.com/EP1184920.html
40. Hosoya, M.; Takahashi, K.; Fukushima, Y., Method for the preparation of cathode active material and method for the preparation of a non-aqueous electrolyte cell. EP1193783 2002. http://www.freepatentsonline.com/EP1193783.html
41. Hosoya, M.; Takahashi, K.; Fukushima, Y., Method for the preparation of cathode active material and method for the preparation of a non-aqueous electrolyte cell. EP1193784 2002. http://www.freepatentsonline.com/EP1193784.html
42. Hosoya, M.; Takahashi, K.; Fukushima, Y., Method for the preparation of cathode active material and method for the preparation of a non-aqueous electrolyte cell. EP1193786 2007. http://www.freepatentsonline.com/EP1193786.html
43. Hosoya, M.; Takahashi, K.; Fukushima, Y., Method for the preparation of cathode active material and method for the preparation of a non-aqueous electrolyte cell. EP1193787 2002. http://www.freepatentsonline.com/EP1193787.html http://v3.espacenet.com/textdoc?DB=EPODOC&IDX=KR20020025819
44. Wissler, M., Graphite and carbon powders for electrochemical applications. *Journal of Power Sources* 2006, 156, (2), 142-150. http://www.sciencedirect.com/science/article/B6TH1-4JRVB7F-1/2/a12b20d1243a2f3a9322962574213d5c
45. Ozawa, M.; Ozawa, E., *Carbon Blacks as the Source Materials for Carbon*, in "Carbon Nanotechnology", Dai, L. (Ed.), Chapt. 6, p. 127-151, Elsevier: Dordrecht, 2006. 2006.
46. Tashima, D.; Kurosawatsu, K.; Uota, M.; Karashima, T.; Sung, Y. M.; Otsubo, M.; Honda, C., Space charge behaviors of electric double layer capacitors with nanocomposite electrode. *Surface & Coatings Technology* 2007, 201, (9-11), 5392-5395. http://dx.doi.org/10.1016/j.surfcoat.2006.07.045
47. Gaberscek, M.; Dominko, R.; Jamnik, J., Is small particle size more important than carbon coating? An example study on LiFePO4 cathodes. *Electrochemistry Communications* 2007, 9, (12), 2778-2783.
48. Nelson, J. R.; Wissing, W. K., Morphology of Electrically Conductive Grades of Carbon-Black. *Carbon* 1986, 24, (2), 115-121. http://dx.doi.org/10.1016/0008-6223(86)90104-1
49. Antisari, M. V.; Montone, A.; Jovic, N.; Piscopiello, E.; Alvani, C.; Pilloni, L., Low energy pure shear milling: A method for the preparation of graphite nano-sheets. *Scripta Materialia* 2006, 55, (11), 1047-1050. http://dx.doi.org/10.1016/j.scriptamat.2006.08.002
50. Wong, S. C.; Sutherland, E. M.; Uhl, F. M., Materials processes of graphite nanostructured composites using ball milling. *Materials and Manufacturing Processes* 2006, 21, (2), 159-166. http://dx.doi.org/10.1081/AMP-200068659
51. Drofenik, M.; Makovec, D.; Kosak, A.; Kristl, M., Synthesis of carbon nanostructures with mechanical alloying. *Progress in Advanced Materials and Processes* 2004, 453-454, 213-217. http://scholar.google.com/scholar?hl=en&lr=&cluster=12937135160538548640
52. Chen, X. H.; Yang, H. S.; Wu, G. T.; Wang, M.; Deng, F. M.; Zhang, X. B.; Peng, J. C.; Li, W. Z., Generation of curved or closed-shell carbon nanostructures by ball-milling of graphite. *Journal of Crystal Growth* 2000, 218, (1), 57-61. http://dx.doi.org/10.1016/S0022-0248(00)00486-3
53. Chen, Y.; Fitz Gerald, J. D.; Chadderton, L. T.; Chaffron, L., Nanoporous carbon produced by ball milling. *Applied Physics Letters* 1999, 74, (19), 2782-2784. http://dx.doi.org/10.1063/1.124012
54. Huang, J. Y.; Yasuda, H.; Mori, H., Highly curved carbon nanostructures produced by ball-milling. *Chemical Physics Letters* 1999, 303, (1-2), 130-134. http://dx.doi.org/10.1016/S0009-2614(99)00131-1
55. Harker, H.; Horsley, J. B.; Robson, D., Active Centres Produced in Graphite by Powdering. *Carbon* 1971, 9, (1), 1-&. http://dx.doi.org/10.1016/0008-6223 (71)90139-4
56. Hentsche, M.; Hermann, H.; Gemming, T.; Wendrock, H.; Wetzig, K., Nanostructured graphite prepared by ball-milling at low temperatures. *Carbon* 2006, 44, (4), 812-814. http://dx.doi.org/10.1016/j.carbon.2005.10.037
57. Salver-Disma, F.; Tarascon, J. M.; Clinard, C.; Rouzaud, J. N., Transmission electron microscopy studies on carbon materials prepared by mechanical milling. *Carbon* 1999, 37, (12), 1941-1959. http://dx.doi.org/10.1016/S0008-6223(99)00059-7
58. Janot, R.; Guerard, D., Ball-milling the behavior of graphite as a function of the dispersal media. *Carbon* 2002, 40, (15), 2887-2896. http://dx.doi.org/10.1016/S0008-6223(02)00223-3
59. Ong, T. S.; Yang, H., Effect of atmosphere on the mechanical milling of natural graphite. *Carbon* 2000, 38, (15), 2077-2085. http://dx.doi.org/10.1016/S0008-6223(00)00064-6
60. Salver-Disma, F.; Du Pasquier, A.; Tarascon, J. M.; Lassegues, J. C.; Rouzaud, J. N., Physical characterization of carbonaceous materials prepared by mechanical grinding. *Journal of Power Sources* 1999, 82, 291-295. http://dx.doi.org/10.1016/S0378-7753(99)00205-0
61. Geim, A. K.; Novoselov, K. S., The rise of graphene. *Nature Materials* 2007, 6, (3), 183-191.
62. Jiang, D. E.; Sumpter, B. G.; Dai, S., Unique chemical reactivity of a graphene nanoribbon's zigzag edge. *Journal of Chemical Physics* 2007, 126, (13). http://dx.doi.org/10.1063/1.2715558
63. Enoki, T.; Kobayashi, Y.; Fukui, K. I., Electronic structures of graphene edges and nanographene. *International Reviews in Physical Chemistry* 2007, 26, 609-645. http://dx.doi.org/10.1080/01442350701611991
64. Hermann, H.; Schubert, T.; Gruner, W.; Mattern, N., Structure and chemical reactivity of ball-milled graphite. *Nanostructured Materials* 1997, 8, (2), 215-229. http://dx.doi.org/10.1016/S0965-9773(97)00010-X
65. Francke, M.; Hermann, H.; Wenzel, R.; Seifert, G.; Wetzig, K., Modification of carbon nanostructures by high energy ball-milling under argon and hydrogen atmosphere. *Carbon* 2005, 43, (6), 1204-1212. http://dx.doi.org/10.1016/j.carbon.2004.12.013
66. Li, G. H.; Kudo, Y.; Liu, K. Y.; Azuma, H.; Tohda, M., X-ray absorption study of LixMnyFe1-yPO4 (0<=x<=1,0 y<=1). *Journal of the Electrochemical Society* 2002, 149, (11), A1414-A1418. http://dx.doi.org/10.1149/1.1510768
67. Tuinstra, F.; Koenig, J. L., Raman Spectrum of Graphite. *Journal of Chemical Physics* 1970, 53, (3), 1126-&. http://dx.doi.org/10.1063/1.1674108
68. Nakamizo, M.; Honda, H.; Inagaki, M., Raman spectra of ground natural graphite. *Carbon* 1978, 16, (4), 281-283. http://dx.doi.org/10.1016/0008-6223(78)90043-X

The invention claimed is:

1. A lithium manganese phosphate/carbon nanocomposite as cathode material for rechargeable electrochemical cells comprising general formula $Li_xMn_yM_{1-y}(PO_4)_z/C$ where M is at least one other metal such as Fe, Ni, Co, Cr, V, Mg, Ca, Al, B, Zn, Cu, Nb, Ti, Zr, La, Ce, Y, x=0.8-1.1, y=0.5-1.0, 0.9<z<1.1, with a carbon content of 0.5 to 20% by weight, wherein nanocomposite is further comprised of oxygen bridges between the $Li_xMn_yM_{1-y}(PO_4)_z$ compound and the carbon.

2. Lithium manganese phosphate/carbon nanocomposite according to claim 1 wherein said oxygen bridges consist of at least one metal oxide bonding layer.

3. Lithium manganese phosphate/carbon nanocomposite according to claim 2 wherein said metal oxide bonding layer is a manganese oxide bonding layer.

4. Lithium manganese phosphate/carbon nanocomposite according to claim 3 wherein said manganese oxide bonding layer consists of either $Mn_3O_4$ (haussmanite), $\beta$-$MnO_2$ (pyrolusite), MnO (manganosit), MnOOH (groutit) or $Mn1.85O.6H_2O$ (birnessite).

5. Lithium manganese phosphate/carbon nanocomposite according to claim 1 wherein said oxygen bridges consist of at least one phosphate bonding layer.

6. A lithium metal phosphate/carbon nanocomposite according to claim 1, wherein the cross-sectional dimension of the $Li_xMn_yM_{1-y}(PO_4)_z$ particles as determined by electron microscopy is not larger then about 200 nm and more preferentially not larger than about 100 nm.

7. A lithium metal phosphate/carbon nanocomposite according to claim 1, wherein the average crystallite size of the $Li_xMn_yM_{1-y}(PO_4)_z$ domains as determined by X-ray diffraction is not larger than about 100 nm, and more preferentially not larger than about 60 nm.

* * * * *